US012778123B2

(12) United States Patent
Kushida et al.

(10) Patent No.: US 12,778,123 B2
(45) Date of Patent: Nov. 3, 2026

(54) *Globodera pallida* CONTROL AGENT

(71) Applicants: NATIONAL AGRICULTURE AND FOOD RESEARCH ORGANIZATION, Tsukuba (JP); NATIONAL UNIVERSITY CORPORATION HOKKAIDO UNIVERSITY, Sapporo (JP); Nippon Soda Co., Ltd., Tokyo (JP)

(72) Inventors: Atsuhiko Kushida, Hokkaido (JP); Itaru Sakata, Hokkaido (JP); Keiji Tanino, Hokkaido (JP); Kousuke Kato, Hokkaido (JP); Takuya Itabashi, Hokkaido (JP); Jun Kanazawa, Tokyo (JP); Yuto Ikeda, Kanagawa (JP); Takashi Kitayama, Kanagawa (JP); Satoshi Koizumi, Kanagawa (JP); Yoko Osawa, Kanagawa (JP); Tsutomu Inoue, Kanagawa (JP)

(73) Assignees: NATIONAL AGRICULTURE AND FOOD RESEARCH ORGANIZATION, Tsukuba (JP); NATIONAL UNIVERSITY CORPORATION HOKKAIDO UNIVERSITY, Sapporo (JP); Nippon Soda Co., Ltd., Tokyo (JP)

( * ) Notice: Subject to any disclaimer, the term of this patent is extended or adjusted under 35 U.S.C. 154(b) by 482 days.

(21) Appl. No.: 18/275,929

(22) PCT Filed: Jan. 27, 2022

(86) PCT No.: PCT/JP2022/002998

§ 371 (c)(1),
(2) Date: Aug. 4, 2023

(87) PCT Pub. No.: WO2022/181170

PCT Pub. Date: Sep. 1, 2022

(65) Prior Publication Data

US 2024/0188565 A1 Jun. 13, 2024

(30) Foreign Application Priority Data

Feb. 24, 2021 (JP) ................................ 2021-027228

(51) Int. Cl.

| | |
|---|---|
| ***C07D 275/02*** | (2006.01) |
| ***A01N 43/08*** | (2006.01) |
| ***A01N 43/10*** | (2006.01) |
| ***A01N 43/18*** | (2006.01) |
| ***A01N 43/36*** | (2006.01) |
| ***A01N 43/38*** | (2006.01) |
| ***A01N 43/40*** | (2006.01) |
| ***A01N 43/80*** | (2006.01) |
| ***A01P 5/00*** | (2006.01) |

(52) U.S. Cl.

CPC ............ *A01N 43/18* (2013.01); *A01N 43/08* (2013.01); *A01N 43/10* (2013.01); *A01N 43/36* (2013.01); *A01N 43/38* (2013.01); *A01N 43/40* (2013.01); *A01N 43/80* (2013.01); *A01P 5/00* (2021.08)

(58) Field of Classification Search

CPC .............................. A01N 43/36; C07D 275/02

See application file for complete search history.

(56) References Cited

PUBLICATIONS

Black et al. Aust. J. Chem., 1973, 26, 2177-2182 (Year: 1973).*
Johnson et al. Aust. J. Chem., 1971, 24, 1643-1658 (Year: 1971).*
Cooper, G. F. Synthesis, 1991, 10, 859-860 (Year: 1991).*
Krohn et al., "Synthese von Derivaten des Diethylstilboestrols mit funktionellen Gruppen in den Seitenketten," Justus Liebigs Annalen der Chemie, 1978, 5, 726-740, compounds indicated on p. 731.
Riggs, N.V., "Coupling constants and free-energy differences in inverting systems," Tetrahedron Letters. 1967, 50, 5109-5112.
Watson et al., "Construction of Multiple, Contiguous Quaternary Stereocenters in Acyclic Molecules by Lithiation-Borylation," Journal of the American Chemical Society, Dec. 3, 2014, 136(50):17370-17373.

(Continued)

*Primary Examiner* — Matthew P Coughlin

(74) *Attorney, Agent, or Firm* — Csaba Henter; MILLEN, WHITE, ZELANO & BRANIGAN

(57) ABSTRACT

An object of the present invention is to provide an industrially easily available hatching factor on *Globodera pallida* larvae, a control agent and a control method using the same. The *Globodera pallida* control agent of the present invention contains, as an active ingredient, at least one selected from a compound of formula (I) below, a stereoisomer thereof, and a salt thereof [wherein Ar represents a substituted or unsubstituted phenyl group or the like; $R^1$ each independently represents a group such as a substituted or unsubstituted C1 to 6 alkyl group and a substituted or unsubstituted C2 to 6 alkenyl group; $R^2$ represents a hydrogen atom or a substituted or unsubstituted C1 to 6 alkyl group; the partial structure —Y—X— represents a group represented by *—N(Rb)—C(=$X^1$)—**; $X^1$ each independently represents an oxygen atom or a sulfur atom; Rb represents hydrogen atom or the like; where * indicates a binding position to the carbon atom having two R1, and ** indicates a binding position to Z; and Z represents a substituted or unsubstituted methylene group, or a substituted or unsubstituted dimethylene group].

(I)

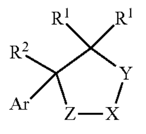

3 Claims, No Drawings

(56) References Cited

PUBLICATIONS

Johnson R. N. et al: "Synthesis and Characterization of the Twelve Isoneric gem-Dimethylphenylvalerolactones and Related Compounds", Australian Journal of Chemistry, Jan. 1, 1971 (Jan. 1, 1971), pp. 1643-1658.

Kim S H et al: "Indium-mediated double Barbier reaction of γ-cyanoesters derived from Baylis-Hillman adduct", Tetrahedron Letters, Elsevier, Amsterdam, NL, vol. 50, No. 15, Apr. 15, 2009 (Apr. 15, 2009), pp. 1696-1698.

* cited by examiner

*Globodera pallida* CONTROL AGENT

CROSS-REFERENCE TO RELATED APPLICATIONS

This application is the U.S. National Stage of PCT/JP2022/002998, filed Jan. 27, 2022, which claims priority to JP 2021-027228, filed Feb. 24, 2021.

TECHNICAL FIELD

The present invention relates to a *Globodera pallida* control agent. Specifically, the present invention relates to a *Globodera pallida* control agent that enables suicidal hatching to be induced and the density of the *Globodera pallida* to be reduced, using lactones and lactams having an effect of inducing the hatching of *Globodera pallida* larvae.

BACKGROUND ART

A kind of potato cyst nematode, *Globodera pallida* (may be hereinafter referred to as "Gp"), is a major pest of potatoes worldwide. Gp cause large yield losses each year by parasitizing potato roots.

100 to 400 Gp eggs are closely embedded and protected in shells called cysts to have an advanced resistance to a low temperature and drying. As long as they do not hatch, eggs in cysts can survive in the soil over a long period of dozen years or so. When potatoes are planted in a field, the larvae in the eggs hatch in response to a specific chemical substance called hatching factors secreted from the potato roots, and the hatched larvae emerge from the cysts and parasitize the potato roots. Gp females, which have enlarged and grown by absorbing nutrients from the roots lay eggs in their own bodies, and end their lives, changing into cysts while adhering to the potato roots. The cysts leave the roots and remain in the soil when the potatoes are harvested. If the next potatoes are planted in many cysts remained soil, those potatoes will also be damaged.

Methods for controlling Gp include (1) application of agricultural chemicals, (2) cultivation of trap crop, such as *Solanum sisymbriifolium*, and (3) cultivation of resistant potatoes.

(1) One of the agricultural chemicals confirmed to be effective for reducing the Gp density in the soil is D-D mainly containing 1,3-dichloropropene, but the D-D is designated as a deleterious substance and is stimulatory and toxic. Therefore, the adverse effects on the soil, the surrounding environment, and worker's health are concerned. Since this agent randomly kills not only harmful cyst nematodes but also various nematodes and micro-organisms in the soil, the impact especially on the biological environment is huge.

(2) Since the trap crops of the family Solanaceae secrete the hatching factors from their roots, the larvae contained in Gp cysts in the field soil hatch, and the larvae enter and parasitize the roots, but Gp cannot take enough nutrition necessary for growth from the trap crops, and most of them die before reaching adulthood. This reduces the Gp density in the field soil. However, during the cultivation period of trap crops, commercial crops cannot be cultivated in that field.

(3) Gp-resistant potatoes secrete a hatching factor from their roots in the same way as common potatoes, but the resistance inhibits the growth of parasitic larvae and causes many of them to die. Therefore, if Gp-resistant potatoes are cultivated in a field contaminated with Gp cysts, the Gp density decreases as in (2), and potatoes can also be harvested. However, imparting a high level of resistance to potatoes requires accumulation of multiple resistance genes, which requires a lot of time and effort. For this reason, there are only a few Gp-resistant potato varieties with high quality available. In addition, since it has been confirmed that the Gp resistance of potatoes will eventually be overcome and the new Gp populations that can grow on the varieties will be appeared, caution is required in its utilization.

Accordingly, any of the methods (1) to (3) has problems.

(4) A method has been proposed in which a natural hatching factor is sprayed on a Gp-contaminated field during a period when potatoes are not cultivated, thereby causing Gp to hatch and starve to death. As a natural hatching factor, Solanoeclepin A is known (Patent Document 1). Solanoeclepin A is a compound having a tricyclodecane structure isolated from a potato hydroponics solution. Although the structure is unknown, hatching factors isolated from potato or tomato root exudates are also known (Patent Document 2). It is also possible to obtain the aforementioned natural hatching factors from the roots of Solanaceae plants, or the callus and hairy roots produced therefrom. However, the amount of hatching factor obtained by any method is very small, and it is difficult to secure the necessary amount for practical use. Therefore, a practical Gp control method using a natural hatching factor has not been developed yet.

(5) Non-natural or inorganic Gp hatching factor has been reported (Non Patent Document 1). Specifically, it is disclosed that picrolonic acid, sodium metavanadate, sodium orthovanadate, and sodium thiocyanate respectively exert hatching activities of about 30, 70, 60, and 30% of that of the natural hatching factor. However, these hatching factors are difficult to put into practical use because they may have insufficient hatching activity or may be harmful substances.

(6) A method of using a mixture of a natural hatching factor and a non-natural hatching factor (Patent Document 3) has also been proposed. Specifically, it is disclosed that a mixture of 4-hydroxybenzyl alcohol and potato root exudate (PRD) has a Gp hatchability of 60% (10% in control). However, the hatching activity is insufficient to use in practical.

Meanwhile, 4-aryl-2-pyrrolidinones such as (Compound 1) 5,5-dimethyl-4-phenyl-2-pyrrolidinone (CAS: 20894-20-6), (Compound 2) 5,5-dimethyl-4-(4-methylphenyl)-2-pyrrolidinone (CAS: 1477653-30-7), (Compound 3) 5,5-dimethyl-4-(4-chlorophenyl)-2-pyrrolidinone (CAS: 36263-12-4), (Compound 4) 5,5-dimethyl-4-(4-bromo phenyl)-2-pyrrolidinone (CAS: 2423033-43-4), and (Compound 5) 1-hydroxy-5,5-dimethyl-4-phenyl-2-pyrrolidinone (CAS: 22307-02-4) exist as compounds known in the literatures (Non Patent Documents 2 and 3).

Further, (Compound 6) 5,5-dimethyl-4-(4-methoxyphenyl)-2-pyrrolidinone (CAS: 1493722-32-9), (Compound 7) 5,5-dimethyl-4-(4-trifluoromethyl phenyl)-2-pyrrolidinone (CAS: 1467865-26-4), (Compound 8) 5,5-dimethyl-4-(4-fluorophenyl)-2-pyrrolidinone (CAS: 1495515-81-5), (Compound 9) 5,5-dimethyl-4-(3-methylphenyl)-2-pyrrolidinone (CAS: 1480195-09-2), (Compound 10) 5,5-dimethyl-4-(2-methylphenyl)-2-pyrrolidinone (CAS: 1466249-92-2), (Compound 11) 5,5-dimethyl-4-(2,5-dimethylphenyl)-2-pyrrolidinone (CAS: 1469103-51-2), (Compound 12) 5,5-dimethyl-4-(3,4-difluoro-phenyl)-2-pyrrolidinone (CAS: 1472745-56-4), (Compound 13) 5,5-dimethyl-4-(3, 4,5-trifluoro-phenyl)-2-pyrrolidinone (CAS: 1484547-30-9), (Compound 14) 5,5-dimethyl-4-(2,4-dimethyl-phenyl)-2-pyrrolidinone (CAS: 1488690-56-7), and the like are commercially available.

(Compound 15) 3,5,5-trimethyl-4-phenyl-2-pyrrolidinone (CAS: 2003396-63-0) is a compound registered in the CAS registry. The physiological actions of these 4-aryl-2-pyrrolidinones are unknown.

(Compound 16) 5,5-dimethyl-4-phenyl pyrrolidine-2-thione (CAS: 35418-39-4) also exists as a compound known in the literature. The physiological action thereof is unknown (Non Patent Document 4).

4-Aryl-dihydrofuran-2(3H)-ones such as (Compound 17) 5,5-dimethyl-4-phenyldihydrofuran-2 (3H)-one (CAS: 13133-96-5), (Compound 18) 5,5-dimethyl-4-(p-tolyl)dihydrofuran-2(3H)-one (CAS: 63507-01-7), (Compound 19) 4-(4-fluorophenyl)-5,5-dimethyldihydrofuran-2(3H)-one (CAS: 245487-39-2), and (Compound 20) 5,5-dimethyl-4-(o-tolyl)dihydrofuran-2(3H)-one (CAS: 73689-82-4) exist as compounds known in the literatures (Non Patent Documents 5 to 7).

Compound 17 is described to have a papaverine-like activity, which is one of vasodilators and antispasmodic agents (Non Patent Document 6) and to be an inflammation inhibitor (Non Patent Document 7).

(Compound 21) 3,3-dimethyl-4-phenyl-cyclopentanone (CAS: 22273-76-3) exists as a compound known in the literature (Non Patent Document 8).

PRIOR ART DOCUMENTS

Patent Documents

[Patent Document 1] WO93/02083A1
[Patent Document 2] WO99/59414
[Patent Document 3] WO2019/032549A1

Non Patent Documents

[Non Patent Document 1] Journal of Nematology, Volume: 33, Issue: 4, Pages: 195-202, 2001
[Non Patent Document 2] Journal of the American Chemical Society, Volume: 142, Issue: 19, Pages: 8672-8681, 2020
[Non Patent Document 3] Australian Journal of Chemistry, Volume: 41, Issue: 1, Pages: 37-47, 1988
[Non Patent Document 4] Australian Journal of Chemistry, Volume: 26, Issue: 10, Pages: 2177-82, 1973
[Non Patent Document 5] Journal of the American Chemical Society, Volume: 121, Issue: 33, Pages: 7708-7709, 1999
[Non Patent Document 6] Praktikates Akademias Athenon, Volume Date: 1982, Volume: 57, Pages: 515-28, 1983
[Non Patent Document 7] European Journal of Medicinal Chemistry, Volume: 12, Issue: 1, Pages: 9-11, 1977
[Non Patent Document 8] Tetrahedron Letters, Issue: 9, Pages: 749-52, 1969

SUMMARY OF THE INVENTION

Object to be Solved by the Invention

In the methods for controlling Gp, the method (1) of using agricultural chemicals is greatly concerned about adverse effects on field environment, marine ecology, and the like, and the use of this method is limited or regulated in major potato exporting countries. The method (2) of cultivating the trap crops have commercial disadvantages, and the method (3) of cultivating Gp-resistant potato varieties should be avoided from continuous planting because of the fear of the emergence of the resistance-breaking populations. The methods (4) to (6) of applying hatching factors to the soil to accelerate the suicidal hatching of Gp to kill them are high in hatching activity and highly effective if natural hatching factors are used, but the amount of hatching factors cannot be secured. Non-natural or inorganic hatching factors have poor hatching activity and cannot be expected to be effective. Thus, all of them are far from being put to practical use.

However, since methods of controlling Gp using hatching factors have no direct biocidal activity, act only on Gp, and are assumed not to have adverse effects on other organisms, they are extremely excellent in view of environmental conservation, ensuring the safety of farmers, and the like. Further, during the crop rotation period when potatoes are not cultivated, the processing time can be freely selected, which has the advantage of not interfering with farming. Accordingly, an object of the present invention is to provide an industrially and easily available hatching factor for Gp, and a control agent and a control method using the factor.

Means to Solve the Object

It has been confirmed that a compound of formula (I) exerts an extremely high hatching accelerating action on Gp, as compared with known non-natural or inorganic hatching factors. That is, the present invention includes the following aspects.

[1] A *Globodera pallida* control agent containing, as an active ingredient, at least one selected from a compound of formula (I) below, a stereoisomer thereof, and a salt thereof:

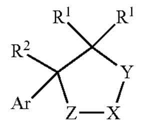

(I)

[wherein

Ar represents a substituted or unsubstituted phenyl group, or a substituted or unsubstituted naphthyl group;

$R^1$ each independently represents a substituted or unsubstituted C1 to 6 alkyl group, a substituted or unsubstituted C2 to 6 alkenyl group, a substituted or unsubstituted C2 to 6 alkynyl group, a substituted or unsubstituted C3 to 6 cycloalkyl group, a substituted or unsubstituted phenyl group, or a substituted or unsubstituted naphthyl group;

$R^2$ represents a hydrogen atom or a substituted or unsubstituted C1 to 6 alkyl group;

a partial structure —Y—X— represents a group represented by *—$CH_2$—C(=$X^1$)—**, a group represented by *—O—C(=$X^1$)—**, a group represented by *—S—C(=$X^1$)—**, a group represented by *—N($R^b$)—C(=$X^1$)—**, or a group represented by *—NH—$SO_2$—**;

where * indicates a binding position to the carbon atom having two $R^1$, and ** indicates a binding position to Z;

$X^1$ each independently represents an oxygen atom or a sulfur atom;

$R^b$ each independently represents a hydrogen atom, a hydroxyl group, a group represented by $R^{b1}$—C(=O)—, a group represented by $R^{b1}$O—C(=O)—, a group represented by $R^{b1}NH—C(=O)—$, or a group represented by $R^{b1}{}_2N—C(=O)—$;

$R^{b1}$ each independently represents a substituted or unsubstituted C1 to 6 alkyl group, a substituted or unsubstituted C2 to 6 alkenyl group, a substituted or unsubstituted C2 to 6 alkynyl group, a substituted or unsubstituted C3 to 6 cycloalkyl group, a substituted or unsubstituted phenyl group, or a substituted or unsubstituted naphthyl group;

Z represents a substituted or unsubstituted methylene group, or a substituted or unsubstituted dimethylene group; and in the case of Z being a substituted methylene group, $R^2$ together with the substituent on the methylene group optionally form a single bond or a methylene group.]

[2] The *Globodera pallida* control agent according to [1], wherein Z in formula (I) is a substituted or unsubstituted methylene group.

[3] The *Globodera pallida* control agent according to [1], wherein Z in formula (I) represents a substituted or unsubstituted dimethylene group.

[4] The *Globodera pallida* control agent according to [1], wherein the partial structure —Y—X— in formula (I) is a group represented by $*—O—C(=X^1)—**$, a group represented by $*—S—C(=X^1)—**$, or a group represented by $*—N(R^b)—C(=X^1)—**$.

[5] The *Globodera pallida* control agent according to [1], wherein the partial structure —Y—X— in formula (I) is a group represented by $*—CH_2—C(=X^1)—**$.

[6] The *Globodera pallida* control agent according to [1], wherein the partial structure —Y—X— in formula (I) is a group represented by $*—NH—SO_2—**$.

[7] The *Globodera pallida* control agent according to [2], wherein the partial structure —Y—X— in formula (I) is a group represented by *—O—C(=O)—**, a group represented by *—O—C(=S)—**, a group represented by *—S—C(=O)—**, a group represented by *—NH—C(=O)—**, a group represented by *—N(OH)—C(=O)—**, or a group represented by *—NH—C(=S)—**.

[8] The *Globodera pallida* control agent according to [2], wherein the partial structure —Y—X— in formula (I) is a group represented by *—O—C(=O)—**, a group represented by *—S—C(=O)—**, or a group represented by *—NH—C(=O)—**.

[9] A *Globodera pallida* hatching factor comprising, as an active ingredient, at least one selected from a compound of formula (I) below, a stereoisomer thereof, and a salt thereof:

(I)

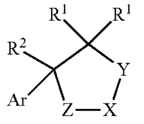

[wherein

Ar represents a substituted or unsubstituted phenyl group, or a substituted or unsubstituted naphthyl group;

$R^1$ each independently represents a substituted or unsubstituted C1 to 6 alkyl group, a substituted or unsubstituted C2 to 6 alkenyl group, a substituted or unsubstituted C2 to 6 alkynyl group, a substituted or unsubstituted C3 to 6 cycloalkyl group, a substituted or unsubstituted phenyl group, or a substituted or unsubstituted naphthyl group;

$R^2$ represents a hydrogen atom or a substituted or unsubstituted C1 to 6 alkyl group;

a partial structure —Y—X— represents a group represented by $*—CH_2—C(=X^1)—**$, a group represented by $*—O—C(=X^1)—**$, a group represented by $*—S—C(=X^1)—**$, a group represented by $*—N(R^b)—C(=X^1)—**$, or a group represented by $*—NH—SO_2—**$;

where * indicates a binding position to the carbon atom having two $R^1$, and ** indicates a binding position to Z;

$X^1$ each independently represents an oxygen atom or a sulfur atom;

$R^b$ each independently represents a hydrogen atom, a hydroxyl group, a group represented by $R^{b1}—C(=O)—$, a group represented by $R^{b1}O—C(=O)—$, a group represented by $R^{b1}NH—C(=O)—$, or a group represented by $R^{b1}{}_2N—C(=O)—$;

$R^{b1}$ each independently represents a substituted or unsubstituted C1 to 6 alkyl group, a substituted or unsubstituted C2 to 6 alkenyl group, a substituted or unsubstituted C2 to 6 alkynyl group, a substituted or unsubstituted C3 to 6 cycloalkyl group, a substituted or unsubstituted phenyl group, or a substituted or unsubstituted naphthyl group;

Z represents a substituted or unsubstituted methylene group, or a substituted or unsubstituted dimethylene group; and in the case of Z being a substituted methylene group, $R^2$ together with the substituent on the methylene group optionally form a single bond or a methylene group.]

[10] A method for controlling *Globodera pallida*, comprising a step of applying the control agent or hatching factor according to any one of [1] to [9] to a field soil inhabited by *Globodera pallida*.

[11] A compound of formula (I-a) below, a stereoisomer thereof, or a salt thereof:

(I-a)

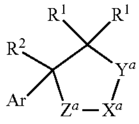

[wherein

Ar represents a substituted or unsubstituted phenyl group, or a substituted or unsubstituted naphthyl group;

$R^1$ each independently represents a substituted or unsubstituted C1 to 6 alkyl group, a substituted or unsubstituted C2 to 6 alkenyl group, a substituted or unsubstituted C2 to 6 alkynyl group, a substituted or unsubstituted C3 to 6 cycloalkyl group, a substituted or unsubstituted phenyl group, or a substituted or unsubstituted naphthyl group;

$R^2$ represents a hydrogen atom or a substituted or unsubstituted C1 to 6 alkyl group;

a partial structure $—Y^a—X^a—$ represents a group represented by $*—O—C(=X^{1a})—**$, a group represented by $*—S—C(=X^{1a})—**$, or a group represented by $*—NH—C(=X^{1a})—**$;

where * indicates a binding position to the carbon atom having two $R^1$, and ** indicates a binding position to $Z^a$;

$X^{1a}$ each independently represents an oxygen atom or a sulfur atom; and $Z^a$ represents a substituted or unsubstituted dimethylene group.]

[12] A compound of formula (I-b) below, a stereoisomer thereof, or a salt thereof:

(I-b)

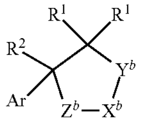

[wherein

Ar represents a substituted or unsubstituted phenyl group, or a substituted or unsubstituted naphthyl group;

$R^1$ each independently represents a substituted or unsubstituted C1 to 6 alkyl group, a substituted or unsubstituted C2 to 6 alkenyl group, a substituted or unsubstituted C2 to 6 alkynyl group, a substituted or unsubstituted C3 to 6 cycloalkyl group, a substituted or unsubstituted phenyl group, or a substituted or unsubstituted naphthyl group;

$R^2$ represents a hydrogen atom or a substituted or unsubstituted C1 to 6 alkyl group;

a partial structure —$Y^b$—$X^b$— represents a group represented by *—O—C(═S)—**, a group represented by *—S—C(═O)—**, or a group represented by *—NH—$SO_2$—**;

where * indicates a binding position to the carbon atom having two $R^1$, and ** indicates a binding position to $Z^b$; and $Z^b$ represents a substituted or unsubstituted methylene group.]

[13] A compound of formula (I-c) below, a stereoisomer thereof, or a salt thereof:

(I-c)

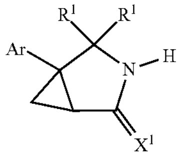

[wherein

Ar represents a substituted or unsubstituted phenyl group, or a substituted or unsubstituted naphthyl group;

$R^1$ each independently represents a substituted or unsubstituted C1 to 6 alkyl group, a substituted or unsubstituted C2 to 6 alkenyl group, a substituted or unsubstituted C2 to 6 alkynyl group, a substituted or unsubstituted C3 to 6 cycloalkyl group, a substituted or unsubstituted phenyl group, or a substituted or unsubstituted naphthyl group; and $X^1$ represents an oxygen atom or a sulfur atom.]

[14] A hatching factor for *Globodera pallida*, comprising, as an active ingredient, any one or more of 5,5-dimethyl-4-phenyl-2-pyrrolidinone having a specific rotation of (−), 5,5-dimethyl-4-(4-methylphenyl)-2-pyrrolidinone having a specific rotation of (−), 5,5-dimethyl-4-(4-chlorophenyl)-2-pyrrolidinone having a specific rotation of (−), or 4-(4-chlorophenyl)-3,3-dimethylisothiazolidine-1,1-dioxide having a specific rotation of (−).

Effect of the Invention

The control agent or hatching factor of the present invention achieves environmental conservation control of Gp, which is the most important pest of potatoes, not only contributes to a significant improvement in productivity of potatoes, but also greatly contributes to alleviating restrictions on potato varieties to be produced. Accordingly, it ultimately contributes to the improvement of quality and yield in the field of agriculture.

Mode of Carrying Out the Invention

[Compound of Formula (I), Stereoisomer Thereof, or Salt Thereof]

An aspect of the present invention provides a *Globodera pallida* control agent comprising, as an active ingredient, at least one selected from a compound of formula (I) below, a stereoisomer thereof, and a salt thereof.

A compound of formula (I) (which may be referred to as a compound (I)), a stereoisomer thereof, or a salt thereof are substances that accelerate the hatching of Gp.

That is, an aspect of the present invention provides a *Globodera pallida* hatching factor comprising, as an active ingredient, at least one selected from a compound of formula (I), a stereoisomer thereof, and a salt thereof.

Compound (I) can hatch Gp larvae by being brought into contact with eggs inside Gp cysts. When compound (I) is brought into contact with Gp cysts to artificially hatch Gp larvae in the absence of potatoes as a nutrient source around the Gp cysts, the hatched Gp can be starved and killed.

(I)

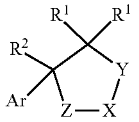

In the formula, Ar represents a substituted or unsubstituted phenyl group, or a substituted or unsubstituted naphthyl group; $R^1$ each independently represents a substituted or unsubstituted C1 to 6 alkyl group, a substituted or unsubstituted C2 to 6 alkenyl group, a substituted or unsubstituted C2 to 6 alkynyl group, a substituted or unsubstituted C3 to 6 cycloalkyl group, a substituted or unsubstituted phenyl group, or a substituted or unsubstituted naphthyl group; $R^2$ represents a hydrogen atom or a substituted or unsubstituted C1 to 6 alkyl group; the partial structure —Y—X— represents a group represented by *—$CH_2$—C(═$X^1$)—**, a group represented by *—O—C(═$X^1$)—**, a group represented by *—S—C(═$X^1$)—**, a group represented by *—N($R^b$)—C(═$X^1$)—**, or a group represented by *—NH—$SO_2$—**; where * indicates a binding position to the carbon atom having two $R^1$, and ** indicates a binding position to Z; $X^1$ each independently represents an oxygen atom or a sulfur atom; $R^b$ each independently represents a hydrogen atom, a hydroxyl group, a group represented by $R^{b1}$—C(═O)—, a group represented by $R^{b1}$O—C(═O)—, a group represented by $R^{b1}$NH—C(═O)—, or a group represented by $R^{b1}{}_2$N—C(═O)—; $R^{b1}$ each independently represents a substituted or unsubstituted C1 to 6 alkyl group, a substituted or unsubstituted C2 to 6 alkenyl group, a substituted or unsubstituted C2 to 6 alkynyl group, a substituted or unsubstituted C3 to 6 cycloalkyl group, a substituted or unsubstituted phenyl group, or a substituted or unsubstituted naphthyl group; Z represents a substituted or unsubstituted methylene group, or a substituted or unsubstituted dimethylene group; and in the case of Z being a substituted methylene group, $R^2$ together with the substituent on the methylene group optionally form a single bond or a methylene group.

Compound (I) also includes hydrates, various solvates, and crystal polymorphs, and the like. Further, compound (I) may have stereoisomers and diastereomers based on an asymmetric carbon. All such optically active isomers and mixtures of optically active isomers are included in the technical scope of the present invention.

Further, salts thereof are also included in the present invention. Details of the salts will be described later.

The term "unsubstituted," as used herein, means the mother nucleus group only. When only the name of the mother nucleus group is described without the description of "substituted", it means "unsubstituted" unless otherwise specified.

Meanwhile, the term "substituted" means that any hydrogen atom in a mother nucleus group is substituted with a group (substituent) having the same or different structure as that of the mother nucleus. Thus, a "substituent" is another group attached to a mother nucleus group. The number of substituents may be one, or two or more. Two or more substituents may be the same or different.

A term such as "C1-6" indicates that the number of carbon atoms in the mother nucleus group is from 1 to 6, and the like. This number of carbon atoms does not include the number of carbon atoms in substituents. For example, a butyl group having an ethoxy group as a substituent is classified as a C2 alkoxy C4 alkyl group.

A "substituent" is not particularly limited as long as it is chemically acceptable and has the effects of the present invention. Groups that can be "substituents" are exemplified below:

a C1 to 6 alkyl group such as a methyl group, an ethyl group, a n-propyl group, an i-propyl group, a n-butyl group, a s-butyl group, an i-butyl group, a t-butyl group, a n-pentyl group, and a n-hexyl group; a C2 to 6 alkenyl group such as a vinyl group, a 1-propenyl group, a 2-propenyl group (allyl group), a 1-butenyl group, a 2-butenyl group, a 3-butenyl group, a 1-methyl-2-propenyl group, a 2-methyl-2-propenyl group; and a C2 to 6 alkynyl group such as an ethynyl group, a 1-propynyl group, a 2-propynyl group, a 1-butynyl group, a 2-butynyl group, a 3-butynyl group, and a 1-methyl-2-propynyl group;

a C3 to 6 cycloalkyl group such as a cyclopropyl group, a cyclobutyl group, a cyclopentyl group, and a cyclohexyl group; a phenyl group and a naphthyl group; a phenyl C1 to 6 alkyl group such as a benzyl group and a phenethyl group; a 3 to 6-membered heterocyclyl group; a 3 to 6-membered heterocyclyl C1 to 6 alkyl group;

a hydroxyl group; a C1 to 6 alkoxy group such as a methoxy group, an ethoxy group, a n-propoxy group, an i-propoxy group, a n-butoxy group, a s-butoxy group, an i-butoxy group, and a t-butoxy group; a C2 to 6 alkenyloxy group such as a vinyloxy group, an allyloxy group, a propenyloxy group, and a butenyloxy group; a C2 to 6 alkynyloxy group such as an ethynyloxy group and a propargyloxy group; a phenoxy group and a naphthoxy group; a benzyloxy group and a phenethyloxy group; a 5 to 6-membered heteroaryloxy group such as a thiazolyloxy group and a pyridyloxy group; a 5 to 6-membered heteroaryl C1 to 6 alkyloxy group such as a thiazolyl methyloxy group and a pyridyl methyloxy group;

a formyl group; a C1 to 6 alkylcarbonyl group such as an acetyl group and a propionyl group; a formyloxy group; a C1 to 6 alkylcarbonyloxy group such as an acetyloxy group and a propionyloxy group; a benzoyl group; a C1 to 6 alkoxycarbonyl group such as a methoxycarbonyl group, an ethoxycarbonyl group, a n-propoxycarbonyl group, an i-propoxycarbonyl group, a n-butoxycarbonyl group, and a t-butoxycarbonyl group; a C1 to 6 alkoxycarbonyloxy group such as a methoxycarbonyloxy group, an ethoxycarbonyloxy group, a n-propoxycarbonyloxy group, an i-propoxycarbonyloxy group, a n-butoxycarbonyloxy group, and a t-butoxycarbonyloxy group; a carboxyl group;

a halogeno group such as a fluoro group, a chloro group, a bromo group, and an iodo group; a C1 to 6 haloalkyl group such as a chloromethyl group, a chloroethyl group, a difluoromethyl group, a trifluoromethyl group, a 2,2,2-trifluoroethyl group, a 1,2-dichloro-n-propyl group, and a 1-fluoro-n-butyl group; a C2 to 6 haloalkenyl group such as a 2-chloro-1-propenyl group and a 2-fluoro-1-butenyl group; a C2 to 6 haloalkynyl group such as a 4,4-dichloro-1-butynyl group, a 4-fluoro-1-pentynyl group, and a 5-bromo-2-pentynyl group; a C1 to 6 haloalkoxy group such as a difluoromethoxy group, a trifluoromethoxy group, a 2,2,2-trifluoroethoxy group, and a 2,3-dichlorobutoxy group; a C2 to 6 haloalkenyloxy group such as a 2-chloropropenyloxy group and a 3-bromobutenyloxy group; a C1 to 6 haloalkylcarbonyl group such as a chloroacetyl group, a trifluoroacetyl group, and a trichloroacetyl group;

an amino group; a C1 to 6 alkyl-substituted amino group such as a methylamino group, a dimethylamino group, and a diethylamino group; an anilino group and a naphthylamino group; a phenyl C1 to 6 alkylamino group such as a benzylamino group and a phenethylamino group; a formylamino group; a C1 to 6 alkylcarbonylamino group such as an acetylamino group, a propanoylamino group, a butyrylamino group, an I-propylcarbonylamino group; a C1 to 6 alkoxycarbonylamino group such as a methoxycarbonylamino group, an ethoxycarbonylamino group, a n-propoxycarbonylamino group, and an I-propoxycarbonylamino group; an unsubstituted or substituted aminocarbonyl group such as an aminocarbonyl group, a dimethylaminocarbonyl group, a phenylaminocarbonyl group, and a N-phenyl-N-methylaminocarbonyl group; an aminocarbonyloxy group; a C1 to 6 alkyl-substituted aminocarbonyloxy group such as an ethylaminocarbonyloxy group and a dimethylaminocarbonyloxy group;

a mercapto group; a C1 to 6 alkylthio group such as a methylthio group, an ethylthio group, a n-propylthio group, an I-propylthio group, a n-butylthio group, an I-butylthio group, a s-butylthio group, and a t-butylthio group; a C1 to 6 haloalkylthio group such as a trifluoromethylthio group and a 2,2,2-trifluoroethylthio group;

a C1 to 6 alkylsulfinyl group such as a methylsulfinyl group, an ethylsulfinyl group, and a t-butylsulfinyl group; a C1 to 6 haloalkylsulfinyl group such as a trifluoromethylsulfinyl group and a 2,2,2-trifluoroethylsulfinyl group; a C1 to 6 alkylsulfonyl group such as a methylsulfonyl group, an ethylsulfonyl group, and a t-butylsulfonyl group; a C1 to 6 haloalkylsulfonyl group such as a trifluoromethylsulfonyl group and a 2,2,2-trifluoroethylsulfonyl group; a phenylsulfonyl group; a 5 to 6-membered heteroarylsulfonyl group such as a thiazolylsulfonyl group and a pyridylsulfonyl group;

a pentafluorosulfanyl group; a cyano group; and a nitro group.

Further, any one of hydrogen atoms in these "substituents" may be optionally substituted with a group having a different structure. As the "substituent" in such a case, a C1 to 6 alkyl group, a C1 to 6 haloalkyl group, a C1 to 6 alkoxy group, a C1 to 6 haloalkoxy group, a halogeno group, a cyano group, a nitro group, or the like may be exemplified.

Further, the aforementioned "3 to 6-membered heterocyclyl group" refers to a 3-membered, 4-membered, 5-membered, or 6-membered group containing 1 to 4 heteroatoms selected from the group consisting of nitrogen atoms, oxygen atoms, and sulfur atoms as ring constituent atoms. The heterocyclyl group may be either monocyclic or polycyclic. As long as at least one ring of a polycyclic heterocyclyl group is a heterocyclic ring, the remaining rings may be saturated alicyclic, unsaturated alicyclic, or aromatic rings. As the "3 to 6-membered heterocyclyl group," a 3 to 6-membered saturated heterocyclyl group, a 5 to 6-membered unsaturated heterocyclyl group, a 5 to 6-membered heteroaryl group, or the like may be exemplified.

As the 3 to 6-membered saturated heterocyclyl group, an aziridinyl group, an epoxy group, an azetidinyl group, a pyrrolidinyl group, a tetrahydrofuranyl group, a dioxolanyl group, a tetrahydropyranyl group, a piperidyl group, a piperazinyl group, a morpholinyl group, a dioxanyl group, or the like may be exemplified.

As the 5 to 6-membered unsaturated heterocyclyl group, a pyrrolinyl group, a dihydrofuranyl group, an imidazolinyl group, a pyrazolinyl group, an oxazolinyl group, an isoxazolinyl group, a thiazolinyl group, an isothiazolinyl group, a dihydropyranyl group, a dihydrooxazinyl group, or the like may be exemplified.

As the 5-membered heteroaryl group, a pyrrolyl group, a furyl group, a thienyl group, an imidazolyl group, a pyrazolyl group, an oxazolyl group, an isoxazolyl group, a thiazolyl group, an isothiazolyl group, a triazolyl group, an oxadiazolyl group, a thiadiazolyl group, a tetrazolyl group, or the like may be exemplified.

As the 6-membered heteroaryl group, a pyridyl group, a pyrazinyl group, a pyrimidinyl group, a pyridazinyl group, a triazinyl group, or the like may be exemplified.

[Ar]

Ar represents a substituted or unsubstituted phenyl group or a substituted or unsubstituted naphthyl group.

The substituent on the "phenyl group" or "naphthyl group" in Ar is preferably a halogeno group such as a fluoro group, a chloro group, a bromo group, and an iodo group; a C1 to 6 alkyl group such as a methyl group, an ethyl group, a n-propyl group, an I-propyl group, a n-butyl group, a s-butyl group, an i-butyl group, a t-butyl group, a n-pentyl group, and a n-hexyl group; a C1 to 6 haloalkyl group such as a chloromethyl group, a chloroethyl group, a trifluoromethyl group, a 1,2-dichloro-n-propyl group, and a 1-fluoro-n-butyl group; a hydroxyl group; a C1 to 6 alkoxy group such as a methoxy group, an ethoxy group, a n-propoxy group, an i-propoxy group, a n-butoxy group, a s-butoxy group, an i-butoxy group, and a t-butoxy group; a C1 to 6 haloalkoxy group such as a 2-chloro-n-propoxy group, a 2,3-dichlorobutoxy group, and a trifluoromethoxy group; a C6 to 10 aryl group such as a phenyl group and a naphthyl group; a C6 to 10 aryl group substituted with a C1 to 6 alkyl group, a C1 to 6 alkoxy group, a halogeno group, a C1 to 6 haloalkyl group, or a C1 to 6 haloalkoxy group, such as a 4-methylphenyl group, a 4-methoxyphenyl group, a 4-chlorophenyl group, a 4-trifluoromethylphenyl group, and a 4-trifluoromethoxyphenyl group; a 5-membered heteroaryl group such as a pyrrolyl group, a furyl group, a thienyl group, an imidazolyl group, a pyrazolyl group, an oxazolyl group, an isoxazolyl group, a thiazolyl group, an isothiazolyl group, a triazolyl group, an oxadiazolyl group, a thiadiazolyl group, and a tetrazolyl group; a 5-membered heteroaryl group substituted with a C1 to 6 alkyl group, a C1 to 6 alkoxy group, a halogeno group, a C1 to 6 haloalkyl group, or a C1 to 6 haloalkoxy group; a 6-membered heteroaryl group such as a pyridyl group, a pyrazinyl group, a pyrimidinyl group, a pyridazinyl group, and a triazinyl group; a 6-membered heteroaryl group substituted with a C1 to 6 alkyl group, a C1 to 6 alkoxy group, a halogeno group, a C1 to 6 haloalkyl group, or a C1 to 6 haloalkoxy group; or a cyano group.

[$R^1$]

$R^1$ each independently represents a substituted or unsubstituted C1 to 6 alkyl group, a substituted or unsubstituted C2 to 6 alkenyl group, a substituted or unsubstituted C2 to 6 alkynyl group, a substituted or unsubstituted C3 to 6 cycloalkyl group, a substituted or unsubstituted phenyl group, or a substituted or unsubstituted naphthyl group.

As the "C1 to 6 alkyl group" in $R^1$, a methyl group, an ethyl group, a n-propyl group, a n-butyl group, a n-pentyl group, a n-hexyl group, an i-propyl group, an I-butyl group, a s-butyl group, a t-butyl group, an i-pentyl group, neopentyl group, a 2-methylbutyl group, an i-hexyl group, or the like may be exemplified.

As the "C2 to 6 alkenyl group" in $R^1$, a vinyl group, a 1-propenyl group, or the like may be exemplified.

As the "C2 to 6 alkynyl group" in $R^1$, an ethynyl group, a 1-propynyl group, or the like may be exemplified.

The substituent on the "C1 to 6 alkyl group", "C2 to 6 alkenyl group", or "C2 to 6 alkynyl group" in $R^1$ is preferably a halogeno group such as a fluoro group, a chloro group, a bromo group, and an iodo group; a hydroxyl group; a C1 to 6 alkoxy group such as a methoxy group, an ethoxy group, a n-propoxy group, an i-propoxy group, a n-butoxy group, a s-butoxy group, an i-butoxy group, and a t-butoxy group; a C1 to 6 haloalkoxy group such as a 2-chloro-n-propoxy group, a 2,3-dichlorobutoxy group, and a trifluoromethoxy group; a C3 to 6 cycloalkyl group such as a cyclopropyl group, a cyclobutyl group, a cyclopentyl group, and a cyclohexyl group; a phenyl group and a naphthyl group; a phenyl group substituted with a C1 to 6 alkyl group, a C1 to 6 alkoxy group, a halogeno group, a C1 to 6 haloalkyl group, or a C1 to 6 haloalkoxy group, such as a 4-methylphenyl group, a 4-methoxyphenyl group, a 4-chlorophenyl group, a 4-trifluoromethylphenyl group, and a 4-trifluoromethoxyphenyl group; a 5-membered heteroaryl group such as a pyrrolyl group, a furyl group, a thienyl group, an imidazolyl group, a pyrazolyl group, an oxazolyl group, an isoxazolyl group, a thiazolyl group, an isothiazolyl group, a triazolyl group, an oxadiazolyl group, a thiadiazolyl group, and a tetrazolyl group; a 5-membered heteroaryl group substituted with a C1 to 6 alkyl group, a C1 to 6 alkoxy group, a halogeno group, a C1 to 6 haloalkyl group, or a C1 to 6 haloalkoxy group; a 6-membered heteroaryl group such as a pyridyl group, a pyrazinyl group, a pyrimidinyl group, a pyridazinyl group, and a triazinyl group; a 6-membered heteroaryl group substituted with a C1 to 6 alkyl group, a C1 to 6 alkoxy group, a halogeno group, a C1 to 6 haloalkyl group, or a C1 to 6 haloalkoxy group; or a cyano group.

As the "C3 to 6 cycloalkyl group" in $R^1$, a cyclopropyl group, a cyclobutyl group, a cyclopentyl group, a cyclohexyl group, or the like may be exemplified.

The substituent on the "C3 to 6 cycloalkyl group", "phenyl group", or "naphthyl group" in $R^1$ is preferably a halogeno group such as a fluoro group, a chloro group, a bromo group, and an iodo group; a C1 to 6 alkyl group such as a methyl group, an ethyl group, a n-propyl group, an i-propyl group, a n-butyl group, a s-butyl group, an i-butyl group, a t-butyl group, a n-pentyl group, and a n-hexyl group; a C1 to 6 haloalkyl group such as a chloromethyl group, a chloroethyl group, a trifluoromethyl group, a 1,2-dichloro-n-propyl group, and a 1-fluoro-n-butyl group; a hydroxyl group; a C1 to 6 alkoxy group such as a methoxy group, an ethoxy group, a n-propoxy group, an i-propoxy group, a n-butoxy group, a s-butoxy group, an I-butoxy group, and a t-butoxy group; a C1 to 6 haloalkoxy group such as a 2-chloro-n-propoxy group, a 2,3-dichlorobutoxy group, and a trifluoromethoxy group; a C6 to 10 aryl group such as a phenyl group and a naphthyl group; a C6 to 10 aryl group substituted with a C1 to 6 alkyl group, a C1 to 6 alkoxy group, a halogeno group, a C1 to 6 haloalkyl group, or a C1 to 6 haloalkoxy group, such as a 4-methylphenyl group, a 4-methoxyphenyl group, a 4-chlorophenyl group, a 4-trifluoromethylphenyl group, and a 4-trifluoromethoxyphenyl group; a 5-membered heteroaryl group such as a pyrrolyl group, a furyl group, a thienyl group, an imidazolyl group, a pyrazolyl group, an oxazolyl group, an isoxazolyl group, a thiazolyl group, an isothiazolyl group, a triazolyl group, an oxadiazolyl group, a thiadiazolyl group, and a tetrazolyl group; a 5-membered heteroaryl group substituted with a C1 to 6 alkyl group, a C1 to 6 alkoxy group, a halogeno group, a C1 to 6 haloalkyl group, or a C1 to 6 haloalkoxy group; a 6-membered heteroaryl group such as a pyridyl group, a pyrazinyl group, a pyrimidinyl group, a pyridazinyl group, and a triazinyl group; a 6-membered heteroaryl group substituted with a C1 to 6 alkyl group, a C1 to 6 alkoxy group, a halogeno group, a C1 to 6 haloalkyl group, or a C1 to 6 haloalkoxy group; or a cyano group.

$R^1$ in the present invention is preferably "a substituted or unsubstituted C1 to 6 alkyl group", particularly preferably a methyl group.

[$R^2$]

$R^2$ represents a hydrogen atom or a substituted or unsubstituted C1 to 6 alkyl group.

As specific examples of the "substituted or unsubstituted C1 to 6 alkyl group" in $R^2$, the same as those mentioned in $R^1$ may be exemplified.

In the present invention, $R^2$ is preferably a hydrogen atom.

[—Y—X—]

The partial structure —Y—X— represents a group represented by *—$CH_2$—C(═$X^1$)—**, a group represented by *—O—C(═$X^1$)—**, a group represented by *—S—C(═$X^1$)—**, a group represented by *—N($R^b$)—C(═$X^1$)—**, or a group represented by *—NH—$SO_2$—**: where * indicates a binding position to the carbon atom having two $R^1$, and ** indicates a binding position to Z; $X^1$ each independently represents an oxygen atom or a sulfur atom; $R^b$ represents a hydrogen atom, a hydroxyl group, a group represented by $R^{b1}$—C(═O)—, a group represented by $R^{b1}$O—C(═O)—, a group represented by $R^{b1}$NH—C(═O)—, or a group represented by $R^{b1}{}_2$N—C(═O)—.

$R^{b1}$ each independently represents a substituted or unsubstituted C1 to 6 alkyl group, a substituted or unsubstituted C2 to 6 alkenyl group, a substituted or unsubstituted C2 to 6 alkynyl group, a substituted or unsubstituted C3 to 6 cycloalkyl group, a substituted or unsubstituted phenyl group, or a substituted or unsubstituted naphthyl group.

As specific examples of the "substituted or unsubstituted C1 to 6 alkyl group", "substituted or unsubstituted C2 to 6 alkenyl group", "substituted or unsubstituted C2 to 6 alkynyl group", "substituted or unsubstituted C3 to 6 cycloalkyl group", "substituted or unsubstituted phenyl group", or "substituted or unsubstituted naphthyl group" in $R^{b1}$, the same as those mentioned in $R^1$ may be exemplified.

As the "group represented by $R^{b1}$—C(═O)—" in $R^b$, an acetyl group, a benzoyl group, or the like may be exemplified.

As the "group represented by $R^{b1}$O—C(═O)—" in $R^b$, a methoxycarbonyl group, a t-butoxycarbonyl group, or the like may be exemplified.

As the "group represented by $R^{b1}$NH—C(═O)—" in $R^b$, a methylaminocarbonyl group, an I-propylaminocarbonyl group, or the like may be exemplified.

As the "group represented by $R^{b1}{}_2$N—C(═O)—" in $R^b$, a dimethylaminocarbonyl group, a diethylaminocarbonyl group, or the like may be exemplified.

In the present invention, $R^b$ is preferably a hydrogen atom or a hydroxyl group.

[Z]

Z represents a substituted or unsubstituted methylene group, or a substituted or unsubstituted dimethylene group, and in the case of Z being a substituted methylene group, $R^2$ together with the substituent on the methylene group optionally form a single bond or a methylene group.

The substituent on the "methylene group" or "dimethylene group" in Z is preferably a C1 to 6 alkyl group such as a methyl group, an ethyl group, a n-propyl group, an i-propyl group, a n-butyl group, a s-butyl group, an i-butyl group, a t-butyl group, a n-pentyl group, and a n-hexyl group; a C1 to 6 haloalkyl group such as a chloromethyl group, a chloroethyl group, a trifluoromethyl group, a 1,2-dichloro-n-propyl group, and a 1-fluoro-n-butyl group; a C1 to 6 alkoxy group such as a methoxy group, an ethoxy group, a n-propoxy group, an i-propoxy group, a n-butoxy group, a s-butoxy group, an i-butoxy group, and a t-butoxy group; a C1 to 6 haloalkoxy group such as a 2-chloro-n-propoxy group, a 2,3-dichlorobutoxy group, and a trifluoromethoxy group; or a cyano group.

As the compound forming, in the case of Z being a substituted methylene group, a methylene group by $R^2$ together with the substituent on the methylene group, a compound of formula (I-c') below may be exemplified.

(I-c')

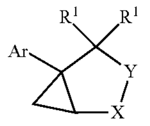

In the formula, Ar, $R^1$, and —Y—X— respectively represents the same as those in formula (I).

As the compound forming, in the case of Z being a substituted methylene group, a single bond by $R^2$ together with the substituent on the methylene group, a compound of formula (I-d') below may be exemplified.

(I-d')

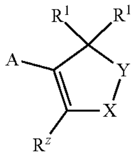

In the formula, Ar, $R^1$, and —Y—X— respectively represents the same as those in formula (I).

$R^Z$ represents a hydrogen atom, a C1 to 6 alkyl group, a C1 to 6 haloalkyl group, a C1 to 6 alkoxy group, a C1 to 6 haloalkoxy group, or a cyano group.

[Compound of Formula (I-a), Stereoisomer Thereof, or Salt Thereof]

An aspect of the present invention provides a compound of formula (I-a) below, a stereoisomer thereof, or a salt thereof.

(I-a)

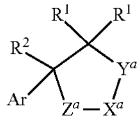

In the formula, Ar represents a substituted or unsubstituted phenyl group or a substituted or unsubstituted naphthyl group; $R^1$ each independently represents a substituted or unsubstituted C1 to 6 alkyl group, a substituted or unsubstituted C2 to 6 alkenyl group, a substituted or unsubstituted C2 to 6 alkynyl group, a substituted or unsubstituted C3 to 6 cycloalkyl group, a substituted or unsubstituted phenyl group, or a substituted or unsubstituted naphthyl group; $R^2$ represents a hydrogen atom or a substituted or unsubstituted C1 to 6 alkyl group; the partial structure —$Y^a$—$X^a$— represents a group represented by *—O—C(=$X^{1a}$)—**, a group represented by *—S—C(=$X^{1a}$)—**, or a group represented by *—NH—C(=$X^{1a}$)—**; where * indicates a binding position to the carbon atom having two $R^1$, and ** indicates a binding position to $Z^a$; $X^{1a}$ each independently represents an oxygen atom or a sulfur atom; and $Z^a$ represents a substituted or unsubstituted dimethylene group.

In the formula, Ar, $R^1$, and $R^2$ respectively represents the same as those in formula (I).

The substituent on the "dimethylene group" in $Z^a$ is preferably a C1 to 6 alkyl group such as a methyl group, an ethyl group, a n-propyl group, an i-propyl group, a n-butyl group, a s-butyl group, an i-butyl group, a t-butyl group, a n-pentyl group, and a n-hexyl group; a C1 to 6 haloalkyl group such as a chloromethyl group, a chloroethyl group, a trifluoromethyl group, a 1,2-dichloro-n-propyl group, and a 1-fluoro-n-butyl group; a C1 to 6 alkoxy group such as a methoxy group, an ethoxy group, a n-propoxy group, an i-propoxy group, a n-butoxy group, a s-butoxy group, ani-butoxy group, and a t-butoxy group; a C1 to 6 haloalkoxy group such as a 2-chloro-n-propoxy group, a 2,3-dichlorobutoxy group, and a trifluoromethoxy group; or a cyano group.

[Compound of Formula (I-b), Stereoisomer Thereof, or Salt Thereof]

An aspect of the present invention provides a compound of formula (I-b) below, a stereoisomer thereof, or a salt thereof.

(I-b)

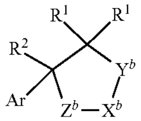

In the formula, Ar represents a substituted or unsubstituted phenyl group or a substituted or unsubstituted naphthyl group; $R^1$ each independently represents a substituted or unsubstituted C1 to 6 alkyl group, a substituted or unsubstituted C2 to 6 alkenyl group, a substituted or unsubstituted C2 to 6 alkynyl group, a substituted or unsubstituted C3 to 6 cycloalkyl group, a substituted or unsubstituted phenyl group, or a substituted or unsubstituted naphthyl group; $R^2$ represents a hydrogen atom or a substituted or unsubstituted C1 to 6 alkyl group; the partial structure —$Y^b$—$X^b$— represents a group represented by *—O—C(=S)—**, a group represented by *—S—C(=O)—**, or a group represented by *—NH—$SO_2$—**; where * indicates a binding position to the carbon atom having two $R^1$, and ** indicates a binding position to $Z^b$; and $Z^b$ represents a substituted or unsubstituted methylene group.

In the formula, Ar, $R^1$, and $R^2$ respectively represents the same as those in formula (I).

The substituent on the "methylene group" in $Z^b$ is preferably a C1 to 6 alkyl group such as a methyl group, an ethyl group, a n-propyl group, an i-propyl group, a n-butyl group, a s-butyl group, an i-butyl group, a t-butyl group, a n-pentyl group, and a n-hexyl group; a C1 to 6 haloalkyl group such as a chloromethyl group, a chloroethyl group, a trifluoromethyl group, a 1,2-dichloro-n-propyl group, and a 1-fluoro-n-butyl group; a C1 to 6 alkoxy group such as a methoxy group, an ethoxy group, a n-propoxy group, an i-propoxy group, a n-butoxy group, a s-butoxy group, an i-butoxy group, and a t-butoxy group; a C1 to 6 haloalkoxy group such as a 2-chloro-n-propoxy group, a 2,3-dichlorobutoxy group, and a trifluoromethoxy group; or a cyano group.

[Compound of Formula (I-c), Stereoisomer Thereof, or Salt Thereof]

An aspect of the present invention provides a compound of formula (I-c) below, a stereoisomer thereof, or a salt thereof.

(I-c)

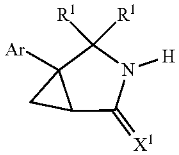

In the formula, Ar represents a substituted or unsubstituted phenyl group or a substituted or unsubstituted naphthyl group; $R^1$ each independently represents a substituted or unsubstituted C1 to 6 alkyl group, a substituted or unsubstituted C2 to 6 alkenyl group, a substituted or unsubstituted C2 to 6 alkynyl group, a substituted or unsubstituted C3 to 6 cycloalkyl group, a substituted or unsubstituted phenyl group, or a substituted or unsubstituted naphthyl group; and $X^1$ represents an oxygen atom or a sulfur atom.

In the formula, Ar and $R^1$ respectively represents the same as those in formula (I).

[Production Method of Compound (I)]

The production method of compound (I) is not limited. For example, compound (I) of the present invention can be obtained by using the following reaction schemes and known reactions as described in Examples.

(Reaction Scheme 1-1)

Among the compounds of formula (I-b), a schematic preparation method of a compound of formula (I-b-1) shown below will be shown in Reaction scheme 1-1 below.

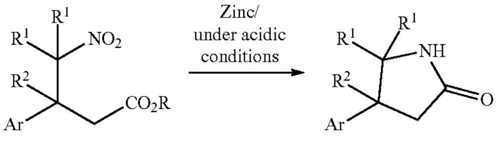

IM-1 (I-b-1)

The symbols in formula (I-b-1) have the same meanings as those in formula (I). The symbols in formula (IM-1) have the same meanings as those in formula (I). R represents a lower alkyl group.

The compound of formula (I-b-1) can be prepared by reducing the nitro group of the compound of formula (IM-1) under acidic conditions using zinc, followed by heating or the like for cyclization.

(Reaction Scheme 1-2)

A schematic preparation method of the compound of formula (IM-1) will be shown in Reaction scheme 1-2 below.

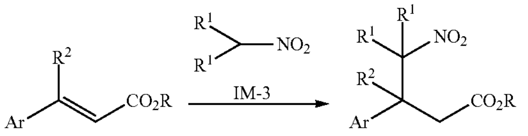

IM-2 IM-1

The symbols in formula (IM-2) have the same meanings as those in formula (I). R represents a lower alkyl group. The symbols in formula (IM-3) have the same meanings as those in formula (I).

The compound of formula (IM-1) can be prepared by performing a Michael addition reaction of the nitroalkane of formula (IM-3) with the cinnamic esters of formula (IM-2) in the presence of a suitable organic base.

(Reaction Scheme 2-1)

Among the compounds of formula (I-a), a schematic preparation method of a compound of formula (I-a-1) shown below will be shown in Reaction scheme 2-1 below.

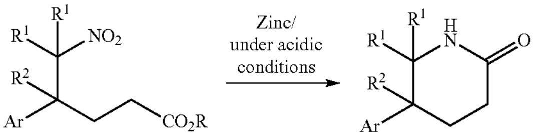

IM-4 (I-a-1)

The symbols in formula (I-a-1) have the same meanings as those in formula (I). The symbols in formula (IM-4) have the same meanings as those in formula (I). R represents a lower alkyl group.

The compound of formula (I-a-1) can be prepared by reducing the nitro group of the compound of formula (IM-4) under acidic conditions using zinc, followed by heating or the like for cyclization.

(Reaction scheme 2-2)

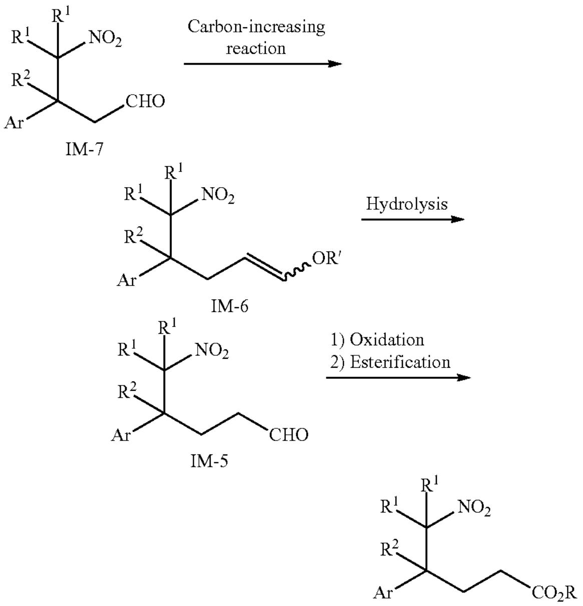

IM-7 IM-6 IM-5 IM-4

A schematic preparation method of the compound of formula (IM-4) will be shown in Reaction scheme 2-2 below.

The symbols in formula (IM-5) have the same meanings as those in formula (I). The symbols in formula (IM-6) have the same meanings as those in formula (I). R' represents a lower alkyl group. The symbols in formula (IM-7) have the same meanings as those in formula (I).

The compound of formula (IM-6) can be prepared by performing a Wittig reaction on the aldehyde of formula (IM-7). (Methoxymethyl)triphenylphosphonium chloride is preferably used for the phosphonium salt.

The aldehyde of formula (IM-5) can be prepared by hydrolyzing enol ethers in the compound of formula (IM-6). The compound of formula (IM-4) can be prepared by oxidizing the aldehyde for derivatization into carboxylic acid, and finally esterifying the carboxylic acid. As the oxidation conditions, it is preferable to use the Kraus-Pinnick oxidation having high functional group selectivity.

(Reaction scheme 2-3)

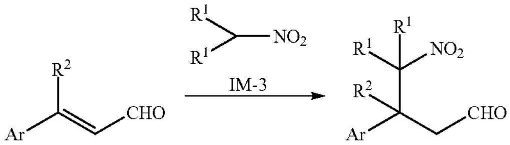

IM-8 IM-7

A schematic preparation method of a compound of formula [IM-7] will be shown in Reaction scheme 2-3 below.

The symbols in formula (IM-8) have the same meanings as those in formula (I).

The compound of formula (IM-7) can be prepared by performing a Michael addition reaction of the nitroalkane of formula (IM-3) with cinnamyl aldehydes of formula (IM-8) in the presence of a suitable organic base.

(Reaction scheme 3-1)

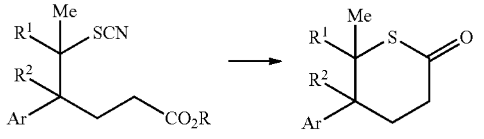

IM-9 (I-a-2)

Among the compounds of formula (I-a), a schematic preparation method of a compound of formula (I-a-2) shown below will be shown in Reaction scheme 3-1 below.

The symbols in formula (I-a-2) have the same meanings as those in formula (I). The symbols in formula (IM-9) have the same meanings as those in formula (I). R represents a lower alkyl group.

The compound of formula (I-a-2) can be prepared by reacting the compound of formula (IM-9) with trimethylaluminum in the presence of a palladium complex.

Here, the palladium complex is oxidatively added between the sulfur and cyano groups in formula (IM-9). Trimethylaluminum transfers the methyl group to the palladium, and accordingly the compound of formula (IM-9) turns into an alkylthioaluminum. Palladium is regenerated as a catalyst by releasing acetonitrile through reductive elimination.

The resulting alkylthioaluminum reacts with the esters in the molecule to give the compound of formula (I-a-2).

(Reaction scheme 3-2)

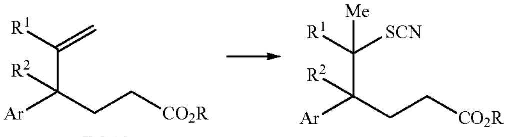

IM-10 IM-9

A schematic preparation method of the compound of formula (IM-9) will be shown in Reaction scheme 3-2 below.

The symbols in formula (IM-10) have the same meanings as those in formula (I). R represents a lower alkyl group.

The compound of formula (IM-9) can be prepared by thiocynating an olefin of formula (IM-10) via Fe (III)/$NaBH_4$.

In this case, the method described in Organic Letters, Volume 14, Issue 6, Pages 1428-1431, 2012 can be referred to.

(Reaction scheme 3-3)

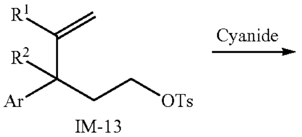

IM-13

-continued

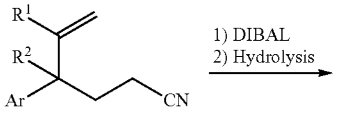

IM-12

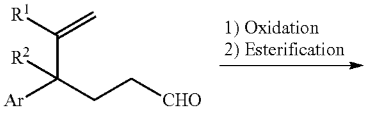

IM-11

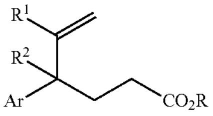

IM-10

A schematic preparation method of the compound of formula (IM-10) will be shown in Reaction scheme 3-3 below.

The symbols in formula (IM-11) have the same meanings as those in formula (I). The symbols in formula (IM-12) have the same meanings as those in formula (I). The symbols in formula (IM-13) have the same meanings as those in formula (I). Ts represents a tosyl group.

The compound of formula (IM-12) can be prepared by cyanating the compound of formula (IM-13). The leaving group is preferably a tosyloxy group or the like.

The aldehyde of formula (IM-11) can be prepared by subjecting a cyano group to DIBAL reduction to form an imine and hydrolyzing the resulting imine. The compound of formula (IM-10) can be prepared by oxidizing the aldehyde for derivatization into carboxylic acid, and finally esterifying the carboxylic acid. As the oxidation conditions, it is preferable to use the Kraus-Pinnick oxidation having high functional group selectivity.

(Reaction scheme 3-4)

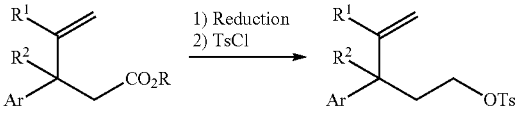

IM-14 IM-13

A schematic preparation method of the compound of formula (IM-13) will be shown in Reaction scheme 3-4 below.

The symbols in formula (IM-14) have the same meanings as those in formula (I). R represents a lower alkyl group. The compound of formula (IM-13) can be prepared by converting the ester moiety in the compound of formula (IM-14) to a hydroxyl group by DIBAL reduction or the like, followed by reaction with TsCl or the like.

(Reaction scheme 3-5)

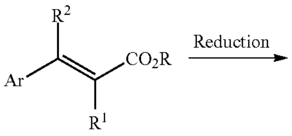

IM-16

-continued

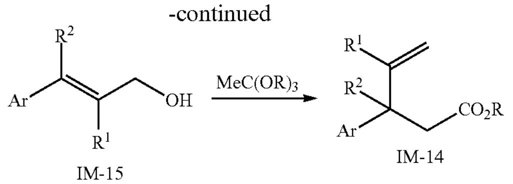

IM-15 IM-14

A schematic preparation method of the compound of formula (IM-14) will be shown in Reaction scheme 3-5 below.

The symbols in formula (IM-15) have the same meanings as those in formula (I). The symbols in formula (IM-16) have the same meanings as those in formula (I). R represents a lower alkyl group.

Compound of formula [IM-14] can be prepared by subjecting allyl alcohols of formula (IM-15) to Johnson-Claisen rearrangement using orthoacetate such as $MeC(OR)_3$ (where R represents a lower alkyl group). The compound of formula (IM-15) can be prepared by DIBAL reduction of cinnamic esters of formula (IM-16).

(Reaction scheme 4)

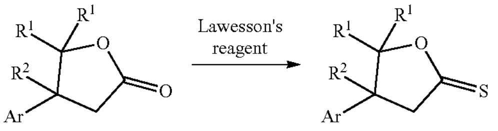

(I-b-2) (I-b-3)

Among the compounds of formula (I-b), a schematic preparation method of a compound of formula (I-b-3) shown below will be shown in Reaction scheme 4 below.

The symbols in formula (I-b-2) have the same meanings as those in formula (I). The symbols in formula (I-b-3) have the same meanings as those in formula (I). The compound of formula (I-b-3) can be prepared by reacting a Lawesson's reagent with the compound of formula (I-b-2).

(Reaction scheme 5)

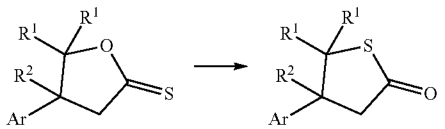

(I-b-3) (I-b-4)

Among the compounds of formula (I-b), a schematic preparation method of a compound of formula (I-b-4) shown below will be shown in Reaction scheme 5 below.

The symbols in formula (I-b-4) have the same meanings as those in formula (I). The thiolactone of formula (I-b-4) can be prepared by isomerizing the thionolactone of formula (I-b-3) with a Lewis acid as a catalyst. In this case, the method described in Tetrahedron Letters, Volume 47, Issue 34, Pages 6067-6070, 2006 can be referred to.

(Reaction scheme 6-1)

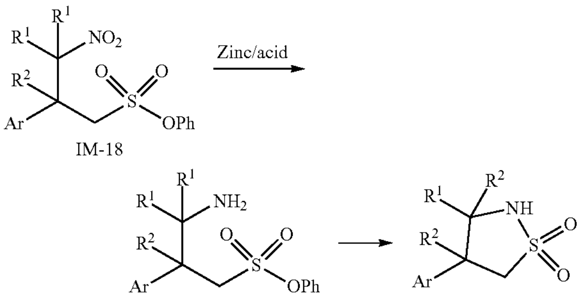

IM-18

IM-17 (I-b-5)

Among the compounds of formula (I-b), a schematic preparation method of a compound of formula (I-b-5) shown below will be shown in Reaction scheme 6-1 below.

The symbols in formula (I-b-5) have the same meanings as those in formula (I). The symbols in formula (IM-17) have the same meanings as those in formula (I). The symbols in formula (IM-18) have the same meanings as those in formula (I).

The compound of formula (I-b-5) can be prepared by reducing the nitro group of the compound of formula (IM-18) under acidic conditions using zinc to give the compound of formula (IM-17), followed by further heating or the like for cyclization.

(Reaction scheme 6-2)

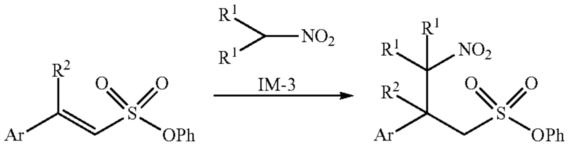

IM-19 IM-18

A schematic preparation method of the compound of formula (IM-18) will be shown in Reaction scheme 6-2 below.

The symbols in formula (IM-19) have the same meanings as those in formula (I).

The compound of formula (IM-18) can be prepared by performing an addition reaction of the nitroalkane of formula (IM-3) with the compound of formula (IM-19) in the presence of a suitable organic base.

(Reaction scheme 6-3)

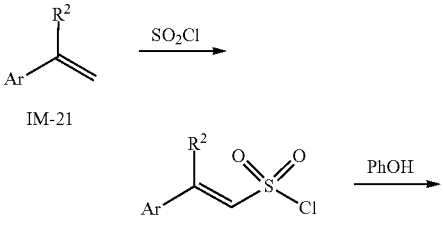

IM-21

IM-20

-continued

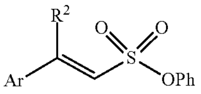

IM-19

A schematic preparation method of the compound of formula (IM-19) will be shown in Reaction scheme 6-3 below.

The symbols in formula (IM-20) have the same meanings as those in formula (I). The symbols in formula (IM-21) have the same meanings as those in formula (I). It can be prepared by reacting the aromatic vinyl of formula (IM-21) with sulfonyl chloride in a DMF solvent to give the compound of formula (IM-20) and then with phenol in the presence of an organic base or the like.

(Reaction scheme 7-1)

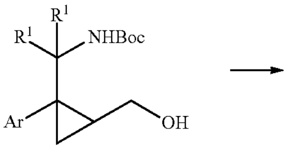

IM-23

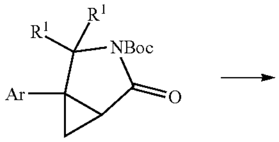

IM-22

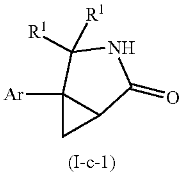

(I-c-1)

Among the compounds of formula (I-c), a schematic preparation method of a compound of formula (I-c-1) shown below will be shown in Reaction scheme 7-1 below.

The symbols in formula (IM-22) have the same meanings as those in formula (I). The symbols in formula (IM-23) have the same meanings as those in formula (I).

The compound of formula (IM-22) can be prepared by converting the methylol moiety of the compound of formula (IM-23) into carboxylic acid by oxidation with chromic acid or the like, followed by cyclization in the presence of a suitable dehydrating agent.

Further, the compound of formula (I-c-1) can be prepared by deprotection.

(Reaction scheme 7-2)

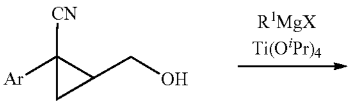

IM-25

-continued

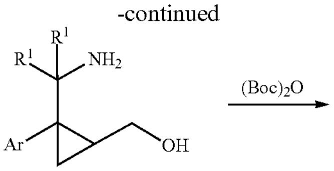

IM-24

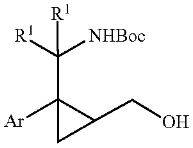

IM-23

A schematic preparation method of the compound of formula (IM-23) will be shown in Reaction scheme 7-2 below.

The symbols in formula (IM-24) have the same meanings as those in formula (I). Ar in formula (IM-25) has the same meaning as that in formula (I).

The compound of formula (IM-24) can be prepared by reacting the compound of formula (IM-25) with a Grignard reagent in the presence of an organic titanium compound such as titanium tetraisopropoxide. In the scheme, the Grignard reagent is shown by $R^1MgX$. $R^1$ has the same meaning as that in formula (I), and X represents a halogeno group.

The compound of formula (IM-23) can be prepared by Boc protection of the compound of formula (IM-24) using di-t-butyl dicarbonate ($Boc_2O$) or the like.

(Reaction scheme 7-3)

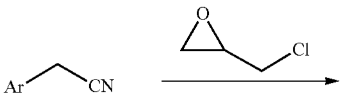

IM-26

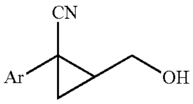

IM-25

A schematic preparation method of the compound of formula (IM-25) will be shown in Reaction scheme 7-3 below.

Ar in formula (IM-26) has the same meaning as that in formula (I).

The compound of formula (IM-25) can be prepared by performing a coupling reaction of arylacetonitrile of formula (IM-26) with epichlorohydrin in the presence of a metal amide such as sodium bis(trimethylsilyl)amide.

[Salts]

The salts of compound (I) and stereoisomers thereof are not particularly limited, as long as they are agriculturally and horticulturally acceptable salts. For example, salts of inorganic acids such as hydrochloric acid and sulfuric acid; salts of organic acids such as acetic acid and lactic acid; salts of alkali metals such as lithium, sodium, and potassium; salts of alkaline earth metals such as calcium and magnesium; salts of transition metals such as iron and copper; salts of organic bases such as triethylamine, tributylamine, pyridine, and hydrazine; ammonia, or the like may be exemplified.

Salts of compound (I) and stereoisomers thereof can be obtained from compound (I) and stereoisomers thereof by known methods.

The compounds shown in Table 1 below are known compounds and can be produced by known methods. Alternatively, they can be purchased for use. In the table, the CAS number of each compound is also shown.

TABLE 1

| Compound No. | Structural formula | CAS No. |
|---|---|---|
| 1 | 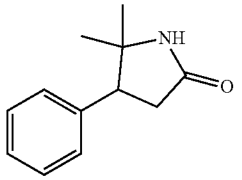 | 20894-20-6 |
| 2 | 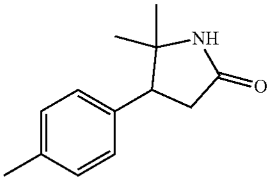 | 1477653-30-7 |
| 3 | 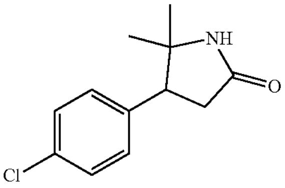 | 36263-12-4 |
| 4 | 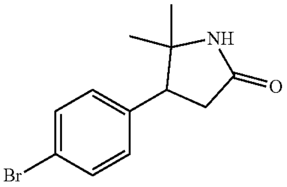 | 2423033-43-4 |
| 5 | 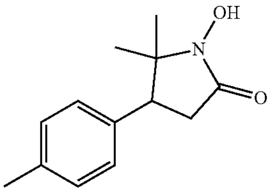 [SMILES: Cc1ccc(C2CC(=O)N(O)C2(C)C)cc1] | 22307-02-4 |
| 6 | 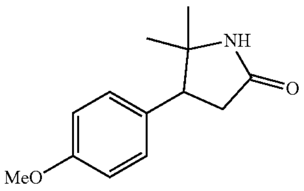 [SMILES: COc1ccc(C2CC(=O)NC2(C)C)cc1] | 1493722-32-9 |
| 7 | 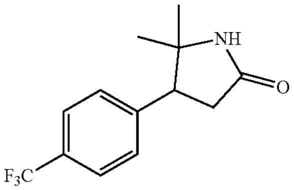 | 1467865-26-4 |

TABLE 1-continued

| Compound No. | Structural formula | CAS No. |
|---|---|---|
| 8 | 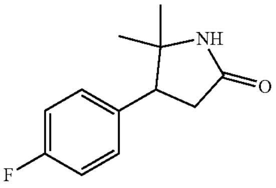 | 1495515-81-5 |
| 9 | 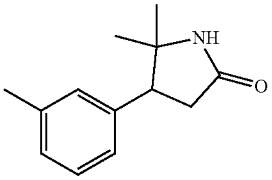 | 1480195-09-2 |
| 10 | 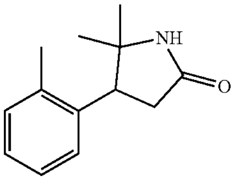 | 1466249-92-2 |
| 11 | 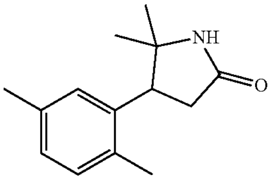 [SMILES: Cc1ccc(C)c(C2CC(=O)NC2(C)C)c1] | 1469103-51-2 |
| 12 | 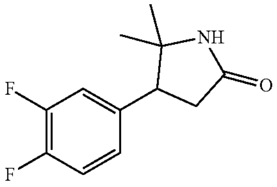 [SMILES: CC1(C)NC(=O)CC1c1ccc(F)c(F)c1] | 1472745-56-4 |
| 13 | 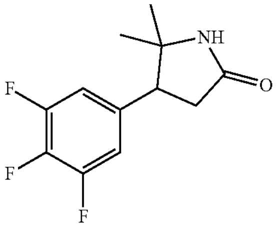 [SMILES: CC1(C)NC(=O)CC1c1cc(F)c(F)c(F)c1] | 1484547-30-9 |
| 14 | 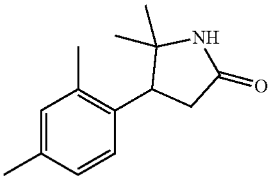 [SMILES: Cc1ccc(C2CC(=O)NC2(C)C)c(C)c1] | 1488690-56-7 |
| 15 | 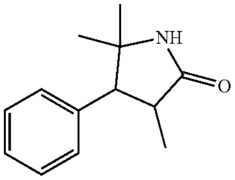 | 2003396-63-0 |

TABLE 1-continued

| Compound No. | Structural formula | CAS No. |
|---|---|---|
| 16 | 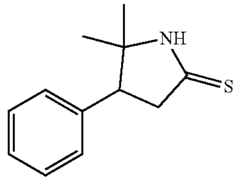 | 35418-39-4 |
| 17 | 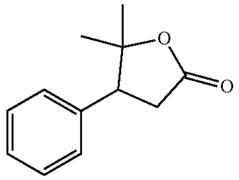 | 13133-96-5 |
| 18 | 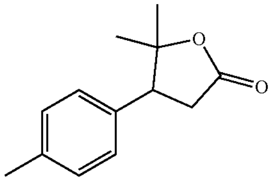 | 63507-01-7 |
| 19 | 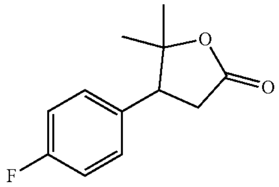 | 245487-39-2 |
| 20 | 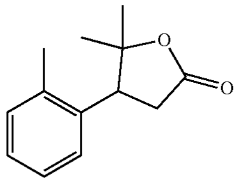 | 73689-82-4 |
| 21 | 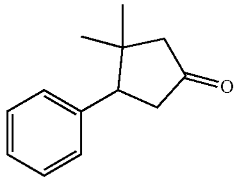 | 22273-76-3 |

[*Globodera pallida* Control Agent]

An aspect of the present invention provides a *Globodera pallida* control agent containing, as an active ingredient, at least one selected from a compound of formula (I) above, a stereoisomer thereof, and a salt thereof.

The control agent of the present invention may consist only of at least one selected from compound (I), a stereoisomer thereof, and a salt thereof or may be formulated into dosage forms generally available as agricultural chemicals, such as a wettable powder, a granule, a dust, an emulsifiable concentrate, a water soluble powder, a suspension, and a flowable.

Known additives or carriers can be used for formulation.

That is, one aspect of the present invention is a control agent containing an agrochemically acceptable solid carrier and/or an agrochemically acceptable liquid carrier.

For forming solid dosage forms, solid carriers including organic and inorganic compounds such as vegetable powders including soybean flour and wheat flour, mineral fine powders including diatomaceous earth, apatite, gypsum, talc, bentonite, pyrophyllite, and clay, sodium benzoate, urea, and mirabilite can be used.

For forming liquid dosage forms, liquid carriers including petroleum fractions such as kerosene, xylene, and solvent naphtha, cyclohexane, cyclohexanone, dimethylformamide, dimethylsulfoxide, alcohols, acetone, trichloroethylene, methyl isobutyl ketone, mineral oils, vegetable oils, and water can be used.

In formulation, a surfactant can be added, as required. As the surfactant, nonionic surfactants such as alkylphenyl ether with polyoxyethylene added, alkyl ether with polyoxyethylene added, higher fatty acid ester with polyoxyethylene added, sorbitan higher fatty acid ester with polyoxyethylene added, and tristyryl phenyl ether with polyoxyethylene added, and a sulfuric acid ester salt of alkylphenyl ether with polyoxyethylene added, formaldehyde condensates such as alkyl naphthalene sulfonate, polycarboxylate, lignosulfonate, and alkyl naphthalene sulfonate, a copolymer of isobutylene-maleic anhydride, or the like may be exemplified.

In the control agent of the present invention, the active ingredient concentration can be appropriately set, depending on the dosage form. For example, the active ingredient concentration in a wettable powder is preferably 5 to 90 wt %, more preferably 10 to 85 wt %. The active ingredient concentration in an emulsifiable concentrate is preferably 3 to 70 wt %, more preferably 5 to 60 wt %. The active ingredient concentration in a granule is preferably 0.01 to 50 wt %, more preferably 0.05 to 40 wt %.

The wettable powder or emulsifiable concentrate thus obtained can be spread or mixed by being diluted in water to a predetermined concentration as a suspension or an emulsion, and the granule can be sprayed or mixed in the soil as it is. When the control agent of the present invention is applied to the field, an appropriate amount of 0.1 g or more per hectare of the active ingredient can be applied.

[Method for Applying *Globodera pallida* Control Agent]

The control agent of the present invention is applied to a field soil inhabited by *Globodera pallida* during the period when potatoes are not cultivated.

The control agent of the present invention is characterized in that its active ingredient is a substance that promotes hatching of Gp larvae. Therefore, Gp can be hatched by applying the control agent of the present invention. Gp are artificially hatched in the absence of potatoes that serve as a source of nutrition by application of the control agent of the present invention, the hatched Gp larvae are driven to starve to die.

While the control agent of the present invention can hatch Gp larvae, it is preferable to be applied between spring and autumn since it is suitable for hatching Gp. During this period, it is preferable to apply the control agent of the present invention before and after the rotation crops are cultivated.

Stable harvesting of potatoes is enabled by removing Gp in the soil before potatoes are cultivated.

That is, an aspect of the present invention provides a method for controlling *Globodera pallida*, comprising a step of applying the control agent of the present invention or the hatching accelerator of the present invention to the soil before potatoes are cultivated.

Gp cysts tend to be distributed at a depth of 0 to 20 cm in the soil. In order to bring the control agent of the present invention into contact with the Gp cysts distributed therein, general soil treatment methods such as soil admixture, soil injection, and soil drenching may be used.

For example, in the case of a solution, it may be diluted to a predetermined concentration, sprayed with a sprayer to the entire field, and mixed by a rotary cultivator. In the case of a granule, it may be spread by a fertilizer spreader and mixed by rotary cultivator.

EXAMPLES

Production Example of Compound (I)

Production Example 1

Synthesis of 6,6-dimethyl-5-(p-tolyl)piperidin-2-one (Compound A-3)

[Step 1]

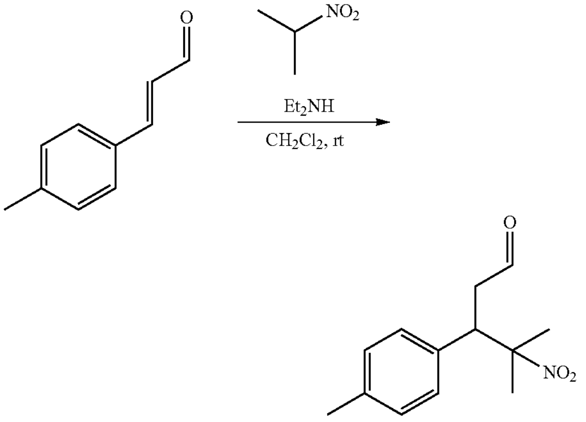

Intermediate 1
95.9%

A mixture of 4-methylcinnamaldehyde (98.89 g), dichloromethane (2.5 L), 2-nitropropane (122.32 g), and diethylamine (100.27 g) was stirred overnight at room temperature.

1N Hydrochloric acid was added to the resulting mixture, and the mixture was extracted with dichloromethane. The resulting organic layer was dried over anhydrous sodium sulfate and concentrated under reduced pressure. 150.54 g of intermediate 1 represented by the aforementioned formula was obtained with a yield of 95.9%.

$^1$H-NMR data of intermediate 1 obtained are shown below. $^1$H-NMR ($CDCl_3$, 399.78 MHz): δ=952 (s, 1H, CHO), 7.26-7.05 (m, 4H, ArH), 3.97-3.94 (m, 1H, —C(Ar)H—), 3.07-2.65 (m, 2H, —CH2-), 2.32 (s, 3H, ArCH3), 1.57 (s, 3H, —CH3), 1.47 s (s, 3H, —CH3).

[Step 2]

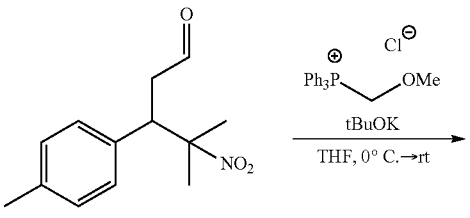

Intermediate 1

-continued

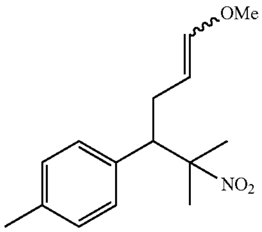

Intermediate 2
71.8%

Potassium tert-butoxide (3.14 g) was added to a mixture of (methoxymethyl)triphenylphosphonium chloride (10.28 g) and THF (100 ml) under cooling with ice, followed by stirring for 30 minutes. Intermediate 1 (4.71 g) was added thereto, followed by further stirring for 30 minutes.

The temperature was raised to room temperature, followed by stirring for 4.5 hours. Water was added to the resulting mixture, and the mixture was extracted with ethyl acetate. The resulting organic layer was dried over anhydrous sodium sulfate and concentrated under reduced pressure. The residue obtained was subjected to silica gel chromatography (hexane:ethyl acetate=9:1) to obtain 4.26 g of intermediate 2 represented by the aforementioned formula with a yield of 80.9%.

[Step 3]

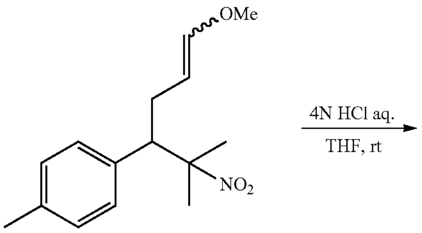

Intermediate 2

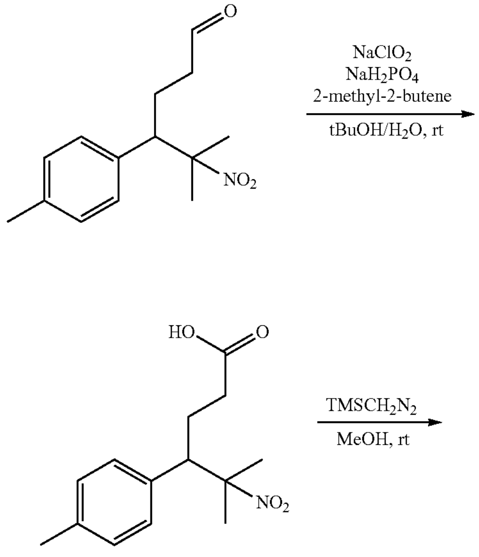

-continued

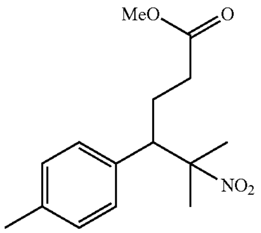

Intermediate 3
57.0%(3 steps)

4N Hydrochloric acid was added to a mixture of intermediate 2 (4.26 g) and THF (30 ml) under cooling with ice. The temperature was raised to room temperature, followed by stirring for 1.5 hours.

Water was added to the resulting mixture, and the mixture was extracted with dichloromethane. The resulting organic layer was dried over anhydrous sodium sulfate and concentrated under reduced pressure. Sodium chlorite (5.86 g), sodium hydrogen phosphate (5.05 g), amylene (11.36 g), tert-butyl alcohol (50 ml), and water (16 ml) were added to the concentrated residue obtained, followed by stirring overnight at room temperature.

Water was added to the resulting mixture, and the mixture was extracted with dichloromethane. The resulting organic layer was dried over anhydrous sodium sulfate and concentrated under reduced pressure. Methanol (80 ml) was added to the concentrated residue, and a 10% hexane solution of trimethylsilyldiazomethane (55.5 g) was added dropwise thereto at room temperature.

The resulting mixture was stirred at room temperature for 1.5 hours and concentrated under reduced pressure. The residue obtained was subjected to silica gel chromatography (hexane:ethyl acetate=9:1) to obtain 2.58 g of intermediate 3 represented by the aforementioned formula with a yield of 57.0%.

$^1$H-NMR data of the resulting intermediate 3 are shown below.

$^1$H-NMR ($CDCl_3$, 399.78 MHz): δ=7.20 (d, 2H, J=8.4 Hz, ArH), 7.06 (d, 2H, J=8.4 Hz, ArH), 3.60 (s, 3H, —COOCH3), 3.33-3.29 (m, 1H, —C(Ar)H—), 2.33 (s, 3H, ArCH3), 2.14-1.84 (m, 4H, —CH2CH2-), 1.60 (s, 3H, —CH3), 1.43 s (s, 3H, —CH3).

[Step 4]

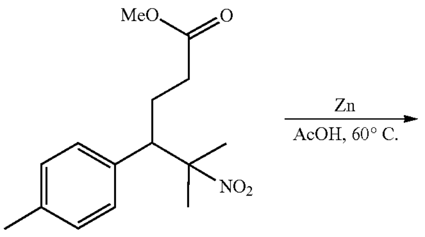

Intermediate 3

-continued

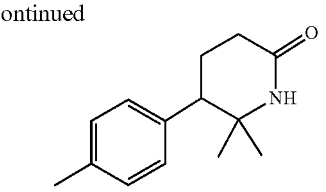

A-3
40.5%

A mixture of intermediate 3 (2.58 g), acetic acid (50 ml), and zinc (12.02 g) was stirred overnight at 60° C.

The resulting mixture was allowed to cool to room temperature and filtered through celite. Water was added to the resulting filtrate, and the mixture was extracted with ethyl acetate. The resulting organic layer was dried over anhydrous sodium sulfate and concentrated under reduced pressure. The residue obtained was subjected to silica gel chromatography (ethyl acetate:methanol=9:1) to obtain 0.81 g of compound A-3 with a yield of 40.5%.

Production Example 2

Synthesis of 5-(4-chlorophenyl)-6,6-dimethyl tetrahydro-2H-thiopyran-2-one (Compound A-6)

[Step 1]

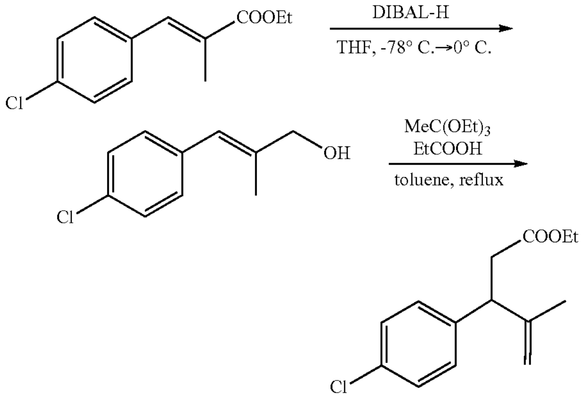

Intermediate 4
82% (2 steps)

A 1.03 M hexane solution of DIBAL-H (4.7 ml) was added to a mixture of ethyl (E)-3-(4-chlorophenyl)-2-methylacrylate (4.63 mg) and THF (9.7 ml) at −78° C. The temperature was raised to 0° C., followed by stirring for 1 hour.

A saturated sodium potassium tartrate aqueous solution was added to the resulting mixture, and the mixture was stirred at room temperature for 1 hour and then extracted with ethyl acetate. The resulting organic layer was dried over anhydrous sodium sulfate and concentrated under reduced pressure.

Toluene (9.7 ml), triethyl orthoacetate (3.5 ml), and propionic acid (14.5 μl) were added to the concentrated residue, followed by stirring overnight under reflux. After cooling to room temperature, water was added, and the mixture was extracted with diethyl ether. The resulting organic layer was dried over anhydrous sodium sulfate and concentrated under reduced pressure. The residue obtained was subjected to silica gel chromatography (hexane:ethyl acetate=98:2) to obtain 400.2 mg of intermediate 4 represented by the aforementioned formula with a yield of 82.0%.

$^1$H-NMR data of the resulting intermediate 4 are shown below.

$^1$H-NMR ($CDCl_3$, 500.16 MHz): δ=7.26 (d, 2H, J=6.3 Hz, ArH), 7.16 (d, 2H, J=8.1 Hz, ArH), 4.89 (s, 2H, =CH2), 4.09-4.02 (m, 2H, —COOCH2-), 3.76 (t, 1H, J=8.0 Hz, —(Ar)CH—), 2.84 (dd, 1H, J=7.5 Hz, 15.5 Hz, —CH2COO—), 2.69 (dd, 1H, J=8.1 Hz, 14.9 Hz, —CH2COO—), 1.60 (s, 3H, —CH3), 1.17 (t, 3H, J=7.4 Hz, —COOCH2CH3).

[Step 2]

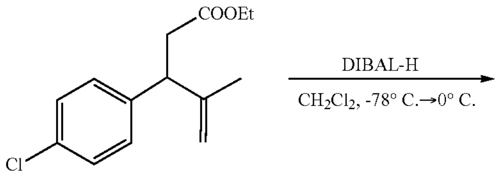

Intermediate 4

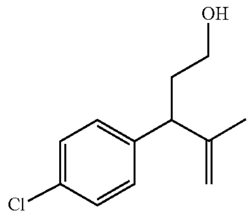

Intermediate 5
quant.

A 1.03 M hexane solution of DIBAL-H (1.91 ml) was added to a mixture of intermediate 4 (199.3 mg) and dichloromethane (3.9 ml) at −78° C. The temperature was raised to 0° C., followed by stirring for 30 minutes.

A saturated sodium potassium tartrate aqueous solution was added to the resulting mixture, and the mixture was stirred at room temperature for 1 hour and then extracted with dichloromethane. The resulting organic layer was dried over anhydrous sodium sulfate and concentrated under reduced pressure. The residue obtained was subjected to silica gel chromatography (hexane:ethyl acetate=8:2) to quantitatively obtain 165.8 mg of intermediate 5 represented by the aforementioned formula.

$^1$H-NMR data of the resulting intermediate 5 are shown below.

$^1$H-NMR ($CDCl_3$, 500.16 MHz): δ=7.27 (d, 2H, J=8.6 Hz, ArH), 7.16 (d, 2H, J=8.6 Hz, ArH), 4.94 (s, 1H, =CH2), 4.87 (s, 1H, =CH2), 3.63 (td, 1H, J=6.3 Hz, 10.4 Hz, —CH2-), 3.56 (t, 1H, J=6.3 Hz, 10.4 Hz, —CH2-), 3.41 (t, 1H, J=8.0 Hz, —CH2O—), 2.13 (qd, 1H, J=6.9 Hz, 13.8 Hz, —(Ar)CH—), 1.96-1.88 (m, 1H, —CH2-), 1.57 (s, 3H, —CH3).

[Step 3]

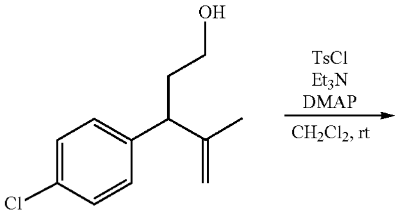

Intermediate 5

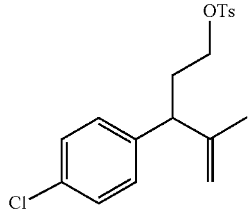

Intermediate 6
93%

A mixture of intermediate 5 (165.8 mg), dichloromethane (3.9 ml), triethylamine (285 μl), tosyl chloride (195.5 mg), and 4-dimethylaminopyridine (4.8 mg) was stirred overnight at room temperature.

Saturated sodium bicarbonate water was added to the resulting mixture, and the mixture was extracted with dichloroethane. The resulting organic layer was dried over anhydrous sodium sulfate and concentrated under reduced pressure. The residue obtained was subjected to silica gel chromatography (hexane:ethyl acetate=95:5) to obtain 269.1 mg of intermediate 6 represented by the aforementioned formula with a yield of 93.0%.

$^1$H-NMR data of the resulting intermediate 6 are shown below.

$^1$H-NMR ($CDCl_3$, 500.16 MHz): δ=7.74 (d, 2H, J=8.1 Hz, —SO2ArH), 7.33 (d, 2H, J=8.0 Hz, —ArH), 7.19 (d, 2H, J=8.1 Hz, ArH), 7.01 (d, 2H, J=8.6 Hz, —SO2ArH), 4.84 (s, 1H=CH2), 4.81 (s, 1H, =CH2), 4.01 (td, 1H, J=5.7 Hz, 9.8 Hz, —CH2-), 3.86-3.82 (m, 1H, —CH2-), 3.29 (t, 1H, J=8.1 Hz, —(Ar)CH—), 2.46 (s, 3H, —ArCH3), 2.23 (qd, 1H, J=6.9 Hz, 14.3 Hz, —CH2-), 1.99-1.92 (m, 1H, —CH2-), 1.50 (s, 3H, —CH3).

[Step 4]

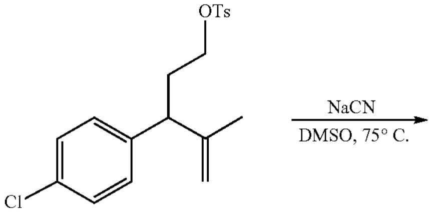

Intermediate 6

-continued

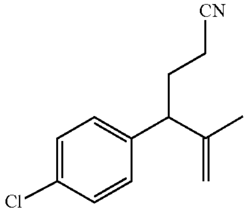

Intermediate 7
quant.

A mixture of intermediate 6 (168.2 mg), dimethylsulfoxide (0.92 ml), and sodium cyanide (113 mg) was stirred at 75° C. for 1 hour.

The resulting mixture was allowed to cool to room temperature, saturated sodium bicarbonate water was added thereto, and the mixture was extracted with diethyl ether. The resulting organic layer was dried over anhydrous sodium sulfate and concentrated under reduced pressure. The residue obtained was subjected to silica gel chromatography (hexane:ethyl acetate=95:5) to quantitatively obtain 105.3 mg of intermediate 7 represented by the aforementioned formula.

$^1$H-NMR data of the resulting intermediate 7 are shown below.

$^1$H-NMR ($CDCl_3$, 500.16 MHz): δ=7.30 (d, 2H, J=8.6 Hz, ArH), 7.15 (d, 2H, J=8.0 Hz, ArH), 4.94 (s, 2H, =CH2), 3.32 (t, 1H, J=8.0 Hz, —(Ar)CH—), 2.33-2.27 (m, 1H, —CH2-), 2.24-2.16 (m, 2H, —CH2-), 2.04-1.97 (m, 1H, —CH2-), 1.57 (s, 3H, —CH3).

[Step 5]

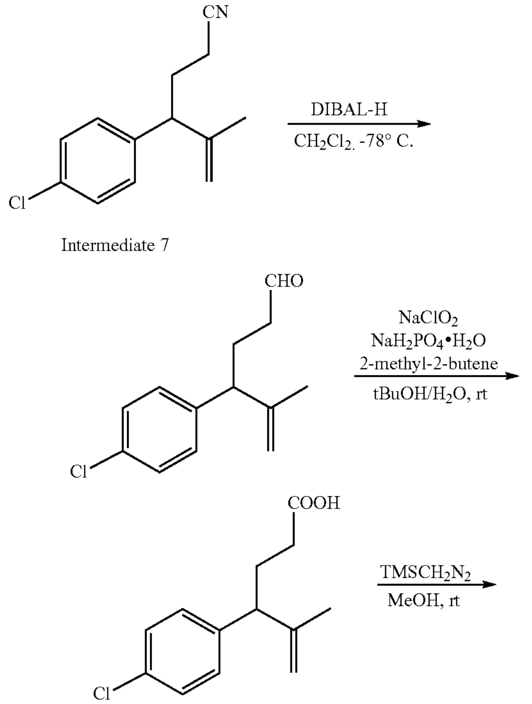

-continued

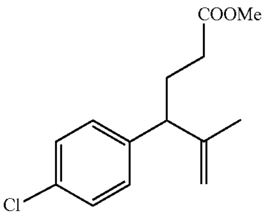

Intermediate 8
91%(3 steps)

A 1.03 M hexane solution of DIBAL-H (895 μl) was added to a mixture of intermediate 7 (105.3 mg) and dichloromethane (2.3 ml) at −78° C. The temperature was raised to 0° C., followed by stirring for 30 minutes.

A 10% tartaric acid aqueous solution was added to the resulting mixture, and the mixture was stirred at room temperature for 1 hour and then extracted with dichloromethane. The resulting organic layer was washed with saturated sodium bicarbonate water, then dried over anhydrous sodium sulfate, and concentrated under reduced pressure.

Sodium chlorite (208.5 mg), sodium hydrogen phosphate (179.8 mg), amylene (497 μl), tert-butyl alcohol (1.73 ml), and water (576 μl) was added to the residue obtained, followed by stirring at room temperature for 30 minutes.

Water was added to the resulting mixture, and the mixture was extracted with ethyl acetate. The resulting organic layer was dried over anhydrous sodium sulfate and concentrated under reduced pressure.

Methanol (2.3 ml) was added to the concentrated residue, and a 10% hexane solution of trimethylsilyldiazomethane (1.15 ml) was added dropwise at room temperature.

The resulting mixture was stirred at room temperature for 30 minutes and concentrated under reduced pressure. The residue obtained was subjected to silica gel chromatography (hexane:ethyl acetate=98:2) to obtain 106.1 mg of intermediate 8 represented by the aforementioned formula with a yield of 91%.

$^1$H-NMR data of the resulting intermediate 8 are shown below. $^1$H-NMR ($CDCl_3$, 500.16 MHz): δ=7.27 (d, 2H, J=8.6 Hz, ArH), 7.14 (d, 2H, J=8.6 Hz, ArH), 4.92 (s, 1H, =CH2), 4.88 (s, 1H, =CH2), 3.65 (s, 3H—COOCH3), 3.18 (t, 1H, J=7.5 Hz, —(Ar)CH—), 2.30-2.21 (m, 2H, —CH2-), 2.18-2.11 (m, 1H, —CH2-), 2.05-1.97 (m, 1H, —CH2-), 1.55 (s, 3H, —CH3).

[Step 6]

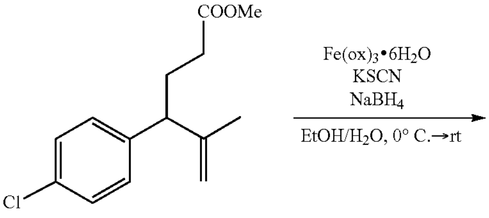

Intermediate 8

-continued

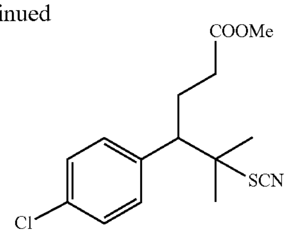

Intermediate 9
53%

Potassium thiocyanate (197.3 mg), ethanol (8.1 ml), intermediate 8 (51.3 mg), and sodium borohydride (49.1 mg) were added to a mixture of iron(III) oxalate hexahydrate (491.1 mg) and water (8.5 ml) under cooling with ice, followed by stirring for 1.5 hours under an argon atmosphere.

Ammonia water was added to the resulting mixture, and the mixture was extracted with dichloromethane. The resulting organic layer was dried over anhydrous sodium sulfate and concentrated under reduced pressure. The residue obtained was subjected to silica gel chromatography (hexane:ethyl acetate=8:2) to obtain 40.0 mg of intermediate 9 represented by the aforementioned formula with a yield of 64.0%.

$^1$H-NMR data of the resulting intermediate 9 are shown below.

$^1$H-NMR ($CDCl_3$, 500.16 MHz): δ=7.33 (d, 2H, J=8.0 Hz, ArH), 7.16 (d, 2H, J=8.6 Hz, ArH), 3.63 (s, 3H, —COOCH3), 2.91-2.88 (m, 1H, —(Ar)CH—), 2.40-2.33 (m, 1H, —CH2-), 2.13-2.03 (m, 3H, —CH2CH2-), 1.51 (s, 3H, —CH3), 1.48 (s, 3H, —CH3).

[Step 7]

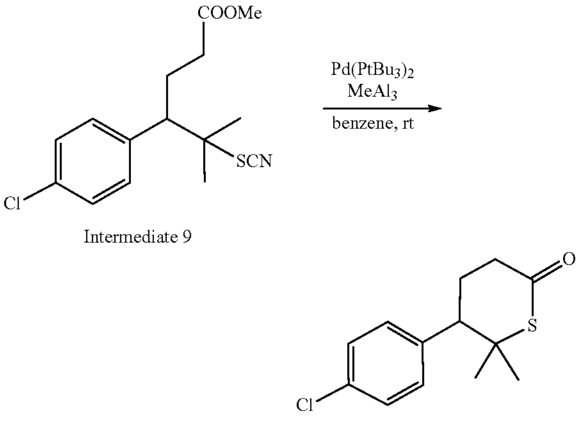

Intermediate 9

A-6
53%

A mixture of intermediate 9 (7.6 mg), benzene (240 μl), trimethylaluminum 2M toluene solution (24.4 μl), and bis (tri-tert-butylphosphine)palladium (0) (2.5 mg) was stirred at room temperature for 30 minutes under an argon atmosphere.

Saturated sodium bicarbonate water was added to the resulting mixture, and the mixture was extracted with diethyl ether. The resulting organic layer was dried over anhydrous sodium sulfate and concentrated under reduced pressure. The residue obtained was subjected to silica gel chromatography (hexane:ethyl acetate=9:10) to obtain 3.3 mg of compound A-6 with a yield of 53.0%.

Production Example 3

Synthesis of 5,5-dimethyl-4-(p-tolyl)dihydrofuran-2 (3H)-thione (Compound B-2)

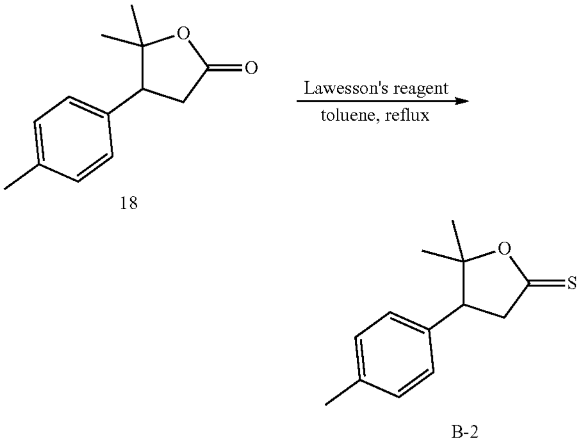

18

B-2
81.9%

A mixture of compound 18 (0.23 g), toluene (10 ml), and a Lawesson's reagent (0.89 g) was stirred overnight under reflux.

The resulting mixture was allowed to cool to room temperature, concentrated under reduced pressure. The residue obtained was subjected to silica gel chromatography (hexane:ethyl acetate=9:1) to obtain 0.19 g of compound B-2 with a yield of 81.9%.

Production Example 4

Synthesis of 5,5-dimethyl-4-(p-tolyl)dihydrothiophene-2 (3H)-one (Compound B-6)

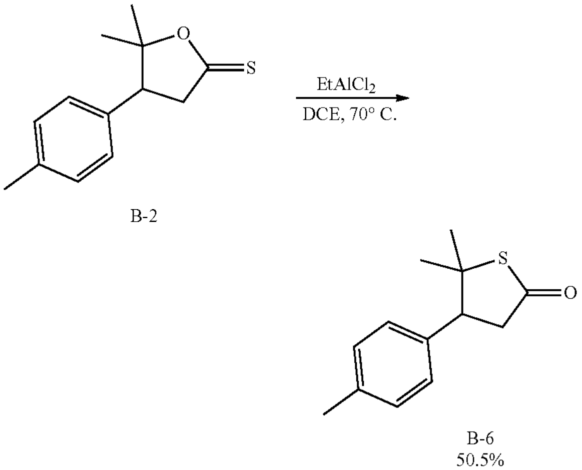

B-2

B-6
50.5%

A mixture of compound B-2 (0.19 g), 1,2-dichloroethane (9 mL), and a 1M ethyl aluminum dichloride hexane solution (1.4 mL) was stirred overnight at 70° C.

The resulting mixture was allowed to cool to room temperature, and the mixture was extracted with dichloromethane. The resulting organic layer was dried over anhydrous sodium sulfate and concentrated under reduced pressure. The residue obtained was subjected to silica gel chromatography (hexane:ethyl acetate=95:5) to obtain 0.10 g of compound B-6 with a yield of 50.5%.

Production Example 5

Synthesis of 4-(4-chlorophenyl)-3,3-dimethylisothiazolidine-1,1-dioxide (Compound B-12)

[Step 1]

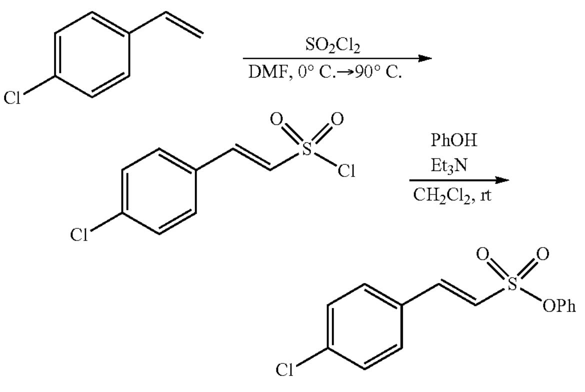

Intermediate 10
44.7%(2 steps)

Sulfuryl chloride (13.4 ml) was added to DMF (12.8 ml) under cooling with ice. After stirring at room temperature for 30 minutes, 4-chloro-styrene (11.50 g) was added thereto. The resulting mixture was stirred at 90° C. for 3 hours.

The resulting mixture was allowed to cool to room temperature, water was added thereto, and the mixture was extracted with dichloromethane. The resulting organic layer was dried over anhydrous sodium sulfate and concentrated under reduced pressure.

Dichloromethane (300 ml) and triethylamine (12.6 g) were added to the concentrated residue obtained, and phenol (8.21 g) was added thereto under cooling with ice. The resulting mixture was stirred overnight at room temperature.

Saturated saline was added thereto, and the mixture was extracted with dichloromethane. The resulting organic layer was dried over anhydrous sodium sulfate and concentrated under reduced pressure. The residue obtained was subjected to silica gel chromatography (hexane:ethyl acetate=9:1) to obtain 10.94 g of intermediate 10 represented by the aforementioned formula with a yield of 44.7%.

$^1$H-NMR data of the resulting intermediate 10 are shown below.

$^1$H-NMR ($CDCl_3$, 399.78 MHz): δ=7.50-7.24 (m, 10H, ArH, —CH═CH—), 6.84 (d, 2H, J=15.6 Hz, —CH═CH—).

[Step 2]

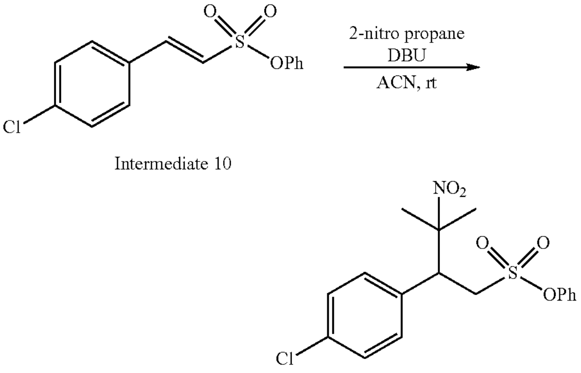

Intermediate 10

Intermediate 11
66.2%

A mixture of intermediate 10 (10.94 g), acetonitrile (100 ml), 2-nitropropane (4.96 g), and DBU (8.48 g) was stirred overnight at room temperature.

1N hydrochloric acid was added thereto, and the mixture was extracted with diethyl ether. The resulting organic layer was dried over anhydrous sodium sulfate and concentrated under reduced pressure. The residue obtained was subjected to silica gel chromatography (hexane:ethyl acetate=9:1) to obtain 9.43 g of intermediate 11 represented by the aforementioned formula with a yield of 66.2%.

$^1$H-NMR data of the resulting intermediate 11 are shown below.

$^1$H-NMR ($CDCl_3$, 399.78 MHz): δ=7.36-7.26 (m, 5H, ArH), 7.18-7.15 (m, 2H, ArH), 6.99-6.97 (m, 2H, ArH), 3.96-3.74 (m, 3H, —C(Ar)HCH2-), 1.58 (s, 6H, —CH3).

[Step 3]

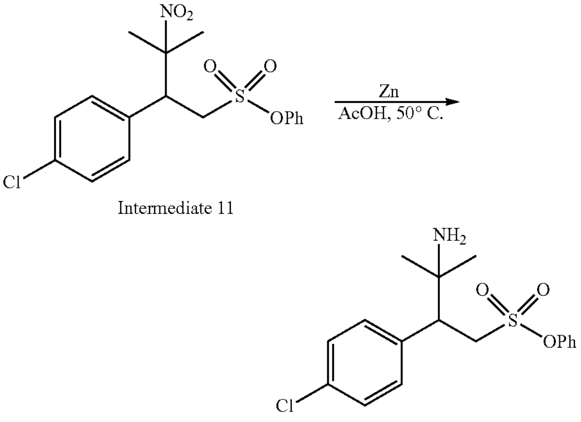

Intermediate 11

Intermediate 12
39.5%

A mixture of intermediate 11 (1.15 g), acetic acid (15 ml), and zinc (3.92 g) was stirred overnight at 50° C. The resulting mixture was allowed to cool to room temperature and filtered through celite. Water was added to the resulting filtrate, and the mixture was extracted with ethyl acetate.

The resulting organic layer was dried over anhydrous sodium sulfate and concentrated under reduced pressure. The residue obtained was subjected to silica gel chromatography (ethyl acetate:methanol=8:2) to obtain 0.42 g of intermediate 12 represented by the aforementioned formula with a yield of 39.5%. $^1$H-NMR data of the resulting intermediate 12 are shown below.

$^1$H-NMR ($CDCl_3$, 399.78 MHz): δ=7.33-7.22 (m, 7H, ArH), 7.00-6.97 (m, 2H, ArH), 4.12-4.08 (m, 1H, —CH2-), 3.77-3.75 (m, 1H, —CH2-), 3.24-3.20 (m, 1H, —C(Ar) H—), 1.15 (s, 3H, —CH3), 1.03 (s, 3H, —CH3).

[Step 3] Intermediate

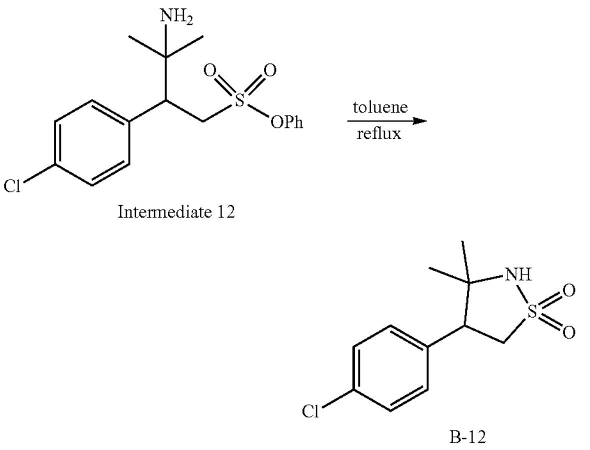

Intermediate 12

B-12
79.4%

A mixture of intermediate 12 (0.42 g) and toluene (6.0 ml) was stirred overnight under reflux.

The resulting mixture was allowed to cool to room temperature, concentrated under reduced pressure. The residue obtained was subjected to silica gel chromatography (hexane:ethyl acetate=5:5) to obtain 0.21 g of compound B-12 with a yield of 79.4%.

Production Example 6

Synthesis of 4,4-dimethyl-5-phenyl-3-azabicyclo [3.1.0]hexan-2-one (Compound C-1)

[Step 1]

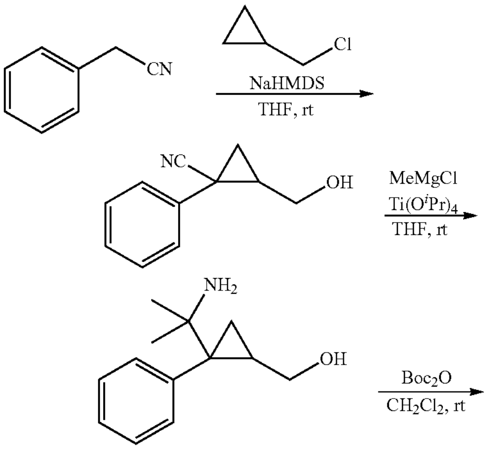

-continued

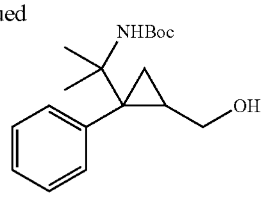

Intermediate 13
12.3% (3 steps)

THF (10 ml) was added to a 1.9 M NaHMDS/THF solution (39.5 ml) and cooled to −10° C. A mixed solution of benzyl cyanide (3.51 g) and THF (45 ml) was added dropwise to this solution, followed by stirring at −10° C. for 10 minutes. Epichlorohydrin (2.54 ml) was added to the resulting mixture, followed by stirring overnight at room temperature.

4 M dioxane hydrochloric acid (30 ml) was added to the resulting mixture, and the mixture was stirred at room temperature for 1.5 hours and then extracted with diethyl ether. The resulting organic layer was dried over anhydrous magnesium sulfate and concentrated under reduced pressure.

THF (50 ml) and a 3 M MeMgCl/THF solution (32 ml) were sequentially added to the concentrated residue obtained, and the mixture was stirred for 30 minutes under heating reflux. The resulting mixture was allowed to cool to room temperature, and then titanium tetraisopropoxide (8.18 ml) was added dropwise thereto, followed by stirring at room temperature for 3 days.

A saturated ammonium chloride aqueous solution and 2N hydrochloric acid were added to the resulting mixture under cooling with ice, and the mixture was filtered through celite. After the filtrate was washed with ethyl acetate, saturated sodium bicarbonate water was added to the resulting aqueous layer to make it basic. The aqueous layer was extracted with ethyl acetate, and the organic layer was dried over anhydrous magnesium sulfate and concentrated under reduced pressure.

Dichloromethane (25 ml) and di-tert-butyl dicarbonate (2.60 g) were added to the concentrated residue obtained, followed by stirring overnight at room temperature.

The resulting mixture was concentrated under reduced pressure, and the residue was subjected to silica gel chromatography (hexane:ethyl acetate=2:1) to obtain 1.13 g of intermediate 13 represented by the aforementioned formula with a yield of 12.3%.

$^1$H-NMR data of the resulting intermediate 13 are shown below.

$^1$H-NMR ($CDCl_3$, 399.78 MHz): δ=7.35-7.19 (m, 5H, ArH), 5.41-5.35 (m, 1H, —NH—), 4.31 (s, 1H, —OH), 4.11-3.77 (m, 2H, —CH2-), 1.48 (s, 3H, —CH3), 1.46 (s, 9H, —(CH3)3), 1.29 (s, 3H, —CH3), 1.28-1.24 (m, 1H, —CH2-), 1.15-1.11 (m, 1H, —CH2-), 0.77-0.65 (m, 1H, —C(C)H—).

[Step 2]

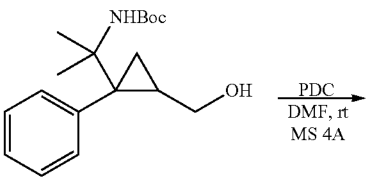

Intermediate 13

-continued

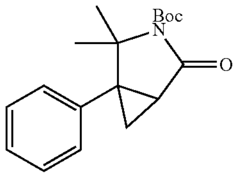

Intermediate 14
81.6% (3 steps)

A mixture of intermediate 13 (1.13 g), DMF (30 ml), molecular sieves 4A (4 g), and pyridinium dichromate (4.18 g) was stirred overnight at room temperature.

The resulting mixture was cooled with ice and filtered through celite. Water and 2N hydrochloric acid were added to the resulting filtrate, and the mixture was extracted with diethyl ether. The resulting organic layer was washed with saturated saline, then dried over anhydrous magnesium sulfate, and concentrated under reduced pressure. The residue obtained was subjected to silica gel chromatography (hexane:ethyl acetate=4:1) to obtain 0.91 g of intermediate 14 represented by the aforementioned formula with a yield of 81.6%.

$^1$H-NMR data of the resulting intermediate 14 are shown below.

$^1$H-NMR ($CDCl_3$, 399.78 MHz): δ=7.35-7.31 (m, 5H, ArH), 2.25 (dd, 1H, —COC(C)H—), 1.60 (s, 3H, —CH3), 1.53 (s, 9H, —(CH3)3), 1.36-1.30 (m, 2H, —CH2-), 1.25 (s, 3H, —CH3).

[Step 3]

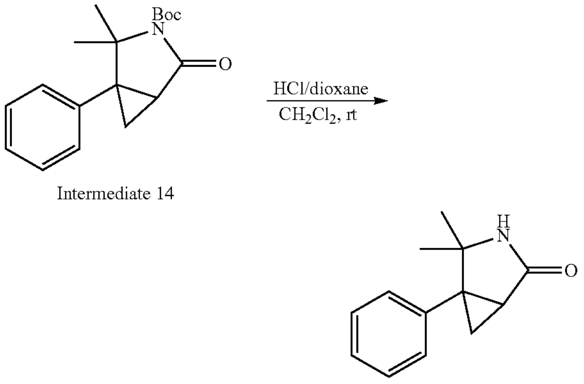

Intermediate 14

C-1
95.2%

A mixture of intermediate 14 (0.50 g), dichloromethane (7 ml), and 4 M dioxane hydrochloric acid (3.32 ml) was stirred at room temperature for 3 hours.

Saturated sodium bicarbonate water was added to the resulting mixture under cooling with ice, and the mixture was extracted with dichloromethane. The resulting organic layer was concentrated under reduced pressure, and the residue was subjected to silica gel chromatography (hexane: ethyl acetate=1:1) to obtain 0.32 g of compound C-1 with a yield of 95.2%.

Tables 2 to 5 show examples of compound (I) produced by the same method as in compounds of Production Examples above. The melting point is also shown as a physical property value.

TABLE 2

| Compound No. | Structural formula | Properties etc. |
|---|---|---|
| A-1 | 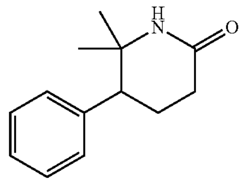 | * |
| A-2 | 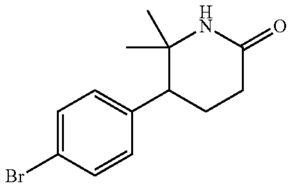 [SMILES: CC1(C)NC(=O)CCC1c1ccc(Br)cc1] | m.p. 182-185° C. |
| A-3 | 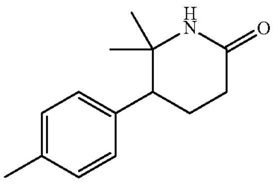 [SMILES: Cc1ccc(C2CCC(=O)NC2(C)C)cc1] | * |
| A-4 | 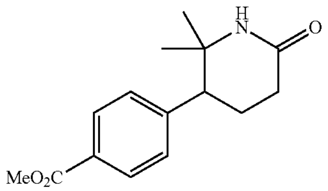 [SMILES: COC(=O)c1ccc(C2CCC(=O)NC2(C)C)cc1] | * |
| A-5 | 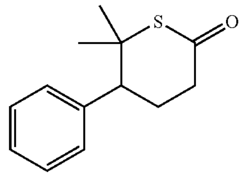 | * |
| A-6 | 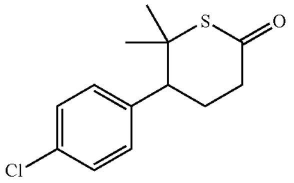 [SMILES: CC1(C)SC(=O)CCC1c1ccc(Cl)cc1] | * |
| A-7 | 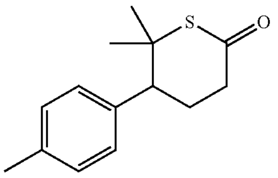 [SMILES: Cc1ccc(C2CCC(=O)SC2(C)C)cc1] | * |

TABLE 3
| Compound No. | Structural formula | Properties etc. |
|---|---|---|
| B-1 | 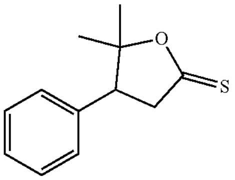 | * |
| B-2 | 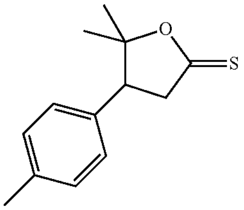 | * |
| B-3 | 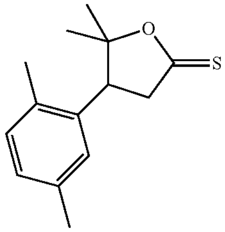 [SMILES: Cc1ccc(C)c(C2CC(=S)OC2(C)C)c1] | * |
| B-4 | 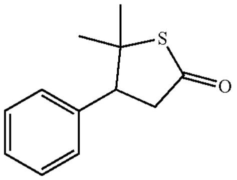 | * |
| B-5 | 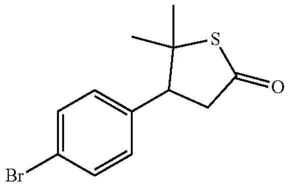 | * |
| B-6 | 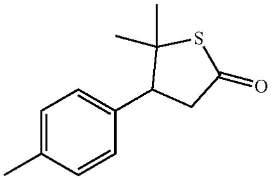 | m.p. 61-62° C. |
| B-7 | 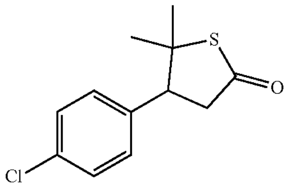 | m.p. 87-89° C. |
TABLE 3-continued
| Compound No. | Structural formula | Properties etc. |
|---|---|---|
| B-8 | 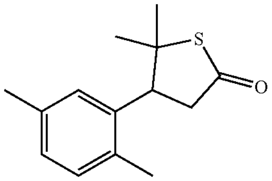 [SMILES: Cc1ccc(C)c(C2CC(=O)SC2(C)C)c1] | m.p. 121-122° C. |
| B-9 | 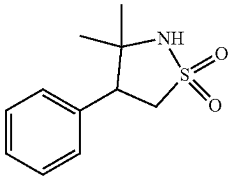 | * |
| B-10 | 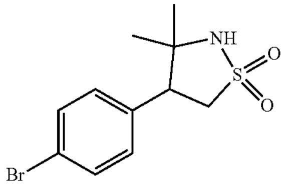 | * |
| B-11 | 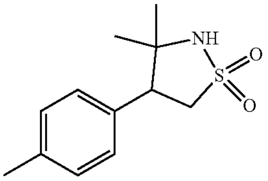 [SMILES: Cc1ccc(C2CS(=O)(=O)NC2(C)C)cc1] | m.p. 128-130° C. |
| B-12 | 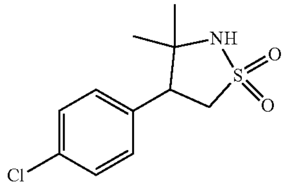 [SMILES: CC1(C)NS(=O)(=O)CC1c1ccc(Cl)cc1] | * |
TABLE 4
| Compound No. | Structural formula | Properties etc. |
|---|---|---|
| C-1 | 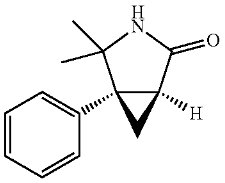 | * |

TABLE 5
| Compound No. | Structural formula | Properties etc. |
|---|---|---|
| D-1 | 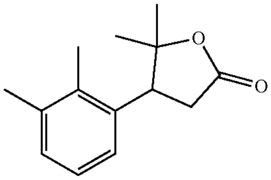 [SMILES: Cc1cccc(C2CC(=O)OC2(C)C)c1C] | m.p. 91-92° C. |
| D-2 | 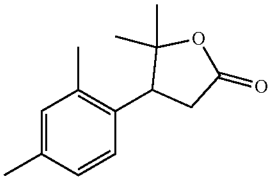 [SMILES: Cc1ccc(C2CC(=O)OC2(C)C)c(C)c1] | * |
| D-3 | 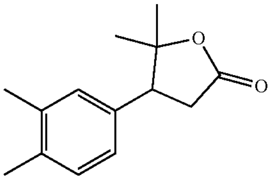 [SMILES: Cc1ccc(C2CC(=O)OC2(C)C)cc1C] | m.p. 75-77° C. |
| D-4 | 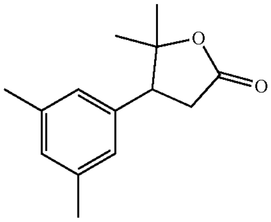 [SMILES: Cc1cc(C)cc(C2CC(=O)OC2(C)C)c1] | * |
| D-5 | 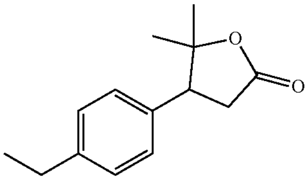 [SMILES: CCc1ccc(C2CC(=O)OC2(C)C)cc1] | * |
| D-6 | 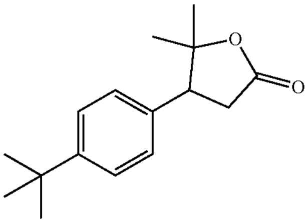 [SMILES: CC(C)(C)c1ccc(C2CC(=O)OC2(C)C)cc1] | m.p. 114-115° C. |
| D-7 | 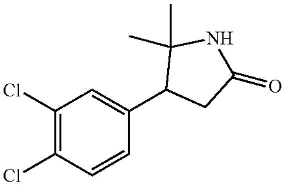 [SMILES: CC1(C)NC(=O)CC1c1ccc(Cl)c(Cl)c1] | m.p. 174-176° C. |
TABLE 5-continued
| Compound No. | Structural formula | Properties etc. |
|---|---|---|
| D-8 | 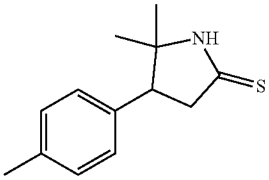 | m.p. 141-142° C. |
| D-9 | 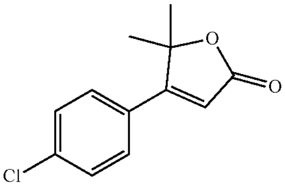 | m.p. 154-156° C. |
| D-10 | 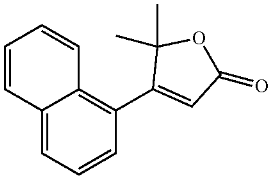 [SMILES: CC1(C)OC(=O)C=C1c1cccc2ccccc12] | m.p. 128-130° C. |
| D-11 | 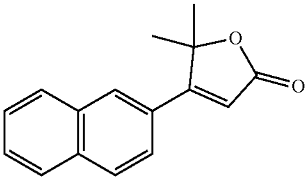 [SMILES: CC1(C)OC(=O)C=C1c1ccc2ccccc2c1] | m.p. 148-150° C. |
| D-12 | 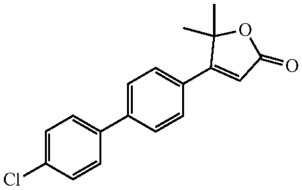 [SMILES: CC1(C)OC(=O)C=C1c1ccc(-c2ccc(Cl)cc2)cc1] | m.p. 165-170° C. |
| D-13 | 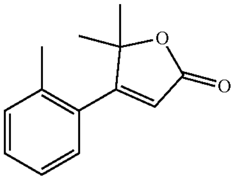 | m.p. 100-102° C. |
| D-14 | 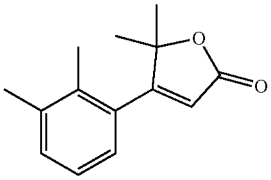 [SMILES: Cc1cccc(C2=CC(=O)OC2(C)C)c1C] | m.p. 78-80° C. |
| D-15 | 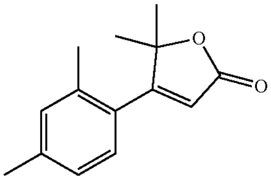 [SMILES: Cc1ccc(C2=CC(=O)OC2(C)C)c(C)c1] | m.p. 81-83° C. |

TABLE 5-continued

| Compound No. | Structural formula | Properties etc. |
|---|---|---|
| D-16 | 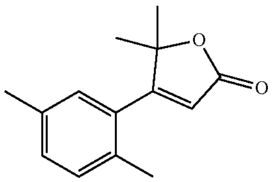 [SMILES: Cc1ccc(C)c(C2=CC(=O)OC2(C)C)c1] | m.p. 56-58° C. |
| D-17 | 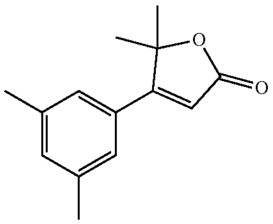 [SMILES: Cc1cc(C)cc(C2=CC(=O)OC2(C)C)c1] | m.p. 51-53° C. |
| D-18 | 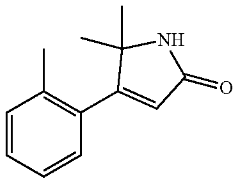 | m.p. 163-165° C. |
| D-19 | 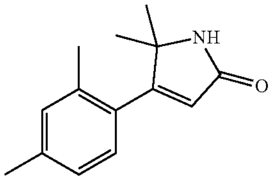 [SMILES: Cc1ccc(C2=CC(=O)NC2(C)C)c(C)c1] | * |

Among the compounds described in Tables 2 to 5, the compounds marked with * in the column of melting point were amorphous or had properties of viscous oil. $^1$H-NMR data thereof are shown below.

compound No. A-1: $^1$H-NMR ($CDCl_3$, 500.16 MHz): δ=7.32-7.21 (m, 5H, ArH), 5.64 (brs, 1H, —NH—), 2.87-2.84 (m, 1H, —C(Ar)H—), 2.60-1.91 (m, 4H, —CH2CH2-), 1.20 (s, 3H, —CH3), 1.08 (s, 3H, —CH3).

compound No. A-3: $^1$H-NMR ($CDCl_3$, 399.78 MHz): δ=7.26-7.08 (m, 4H, ArH), 5.61 (brs, 1H, —NH—), 2.84-2.80 (m, 1H, —C(Ar)H—), 2.60-1.87 (m, 4H, —CH2CH2-), 2.31 (s, 3H, ArCH3), 1.19 (s, 3H, —CH3), 1.07 (s, 3H, —CH3).

compound No. A-4: $^1$H-NMR ($CDCl_3$, 500.16 MHz): δ=7.99 (d, 2H, J=8.1 Hz, ArH), 7.30 (d, 2H, J=8.1 Hz, ArH), 5.79 (brs, 1H, —NH—), 3.92 (s, 3H, —COOCH3), 2.94-2.91 (m, 1H, —C(Ar) H—), 2.61-1.92 (m, 4H, —CH2CH2-), 1.21 (s, 3H, —CH3), 1.08 (s, 3H, —CH3).

compound No. A-5: $^1$H-NMR ($CDCl_3$, 500.16 MHz): δ=7.33-7.28 (m, 3H, ArH), 7.22-7.20 (m, 2H, ArH), 3.15-3.13 (m, 1H, —C(Ar)H—), 2.85-2.10 (m, 4H, —CH2CH2-), 1.39 (s, 3H, —CH3), 1.32 (s, 3H, —CH3).

compound No. A-6: $^1$H-NMR ($CDCl_3$, 500.16 MHz): δ=7.32-7.31 (d, 2H, J=8.6 Hz, ArH), 7.16-7.14 (d, 2H, J=8.0 Hz, ArH), 3.14 (dd, 1H, J=1.7 Hz, 12.0 Hz, —C(Ar)H—), 2.86-2.81 (m, 1H, —CH2CH2-), 2.74 (ddd, 1H, J=5.8 Hz, 12.1 Hz, 17.8 Hz, —CH2CH2-), 2.58-2.49 (m, 1H, —CH2CH2-), 2.10-2.05 (m, 1H, —CH2CH2-), 2.85-2.06 (m, 4H, —CH2CH2-), 1.36 (s, 3H, —CH3), 1.30 (s, 3H, —CH3).

compound No. A-7: $^1$H-NMR ($CDCl_3$, 500.16 MHz): δ=7.13 (d, 2H, J=8.1 Hz, ArH), 7.09 (d, 2H, J=8.0 Hz, ArH), 3.11-3.09 (m, 1H, —C(Ar)H—), 2.85-2.06 (m, 4H, —CH2CH2-), 2.34 (s, 3H, ArCH3), 1.37 (s, 3H, —CH3), 1.30 (s, 3H, —CH3). compound No. B-1: $^1$H-NMR ($CDCl_3$, 500.16 MHz): δ=7.37-7.18 (m, 5H, ArH), 3.55-3.49 (m, 3H, —C(Ar)HCH2-), 1.64 (s, 3H, —CH3), 1.12 (s, 3H, —CH3). compound No. B-2: $^1$H-NMR ($CDCl_3$, 500.16 MHz): δ=7.17-7.07 (m, 4H, ArH), 3.50-3.48 (m, 3H, —C(Ar) HCH2-), 2.35 (s, 3H, ArCH3), 1.62 (s, 3H, —CH3), 1.12 (s, 3H, —CH3). compound No. B-3: $^1$H-NMR ($CDCl_3$, 500.16 MHz): δ=7.26-6.94 (m, 3H, ArH), 3.79-3.39 (m, 3H, —C(Ar)HCH2-), 2.30 (s, 3H, —ArCH3), 2.28 (s, 3H, —ArCH3), 1.64 (s, 3H, —CH3), 1.16 (s, 3H, —CH3).

compound No. B-4: $^1$H-NMR ($CDCl_3$, 500.16 MHz): δ=7.36-7.22 (m, 5H, ArH), 3.63-2.87 (m, 3H, —C(Ar) HCH2-), 1.57 (s, 3H, —CH3), 1.31 (s, 3H, —CH3).

compound No. B-5: $^1$H-NMR ($CDCl_3$, 500.16 MHz): δ=7.49 (d, 2H, J=8.6 Hz, ArH), 7.13 (d, 2H, J=8.6 Hz, ArH), 3.58-2.87 (m, 3H, —C(Ar)HCH2-), 1.55 (s, 3H, —CH3), 1.29 (s, 3H, —CH3).

compound No. B-9: $^1$H-NMR ($CDCl_3$, 500.16 MHz): δ=7.39-7.24 (m, 5H, ArH), 4.26 (brs, 1H, —NH—), 3.79-3.53 (m, 3H, —C(Ar)HCH2-), 1.40 (s, 3H, —CH3), 1.11 (s, 3H, —CH3).

compound No. B-10: $^1$H-NMR ($CDCl_3$, 500.16 MHz): δ=7.52-7.12 (m, 4H, ArH), 4.20 (brs, 1H, —NH—), 3.75-3.54 (m, 3H, —C(Ar)HCH2-), 1.40 (s, 3H, —CH3), 1.11 (s, 3H, —CH3).

compound No. B-12: $^1$H-NMR ($CDCl_3$, 500.16 MHz): δ=7.37-7.18 (m, 4H, ArH), 4.27 (brs, 1H, —NH—), 3.74-3.55 (m, 3H, —C(Ar)HCH2-), 1.40 (s, 3H, —CH3), 1.10 (s, 3H, —CH3).

compound No. C-1: $^1$H-NMR ($CDCl_3$, 399.78 MHz): δ=7.35-7.28 (m, 5H, ArH), 5.06 (s, 1H, —NH—), 2.20-2.16 (m, 1H, —COCH—), 1.38 (s, 3H, —CH3), 1.35-1.33 (dd, 1H, —CH2-), 1.28-1.25 (dd, 1H, —CH2-), 1.08 (s, 3H, —CH3).

compound No. D-2: $^1$H-NMR ($CDCl_3$, 399.78 MHz): δ=7.06-7.01 (m, 3H, ArH), 3.77-3.73 (m, 1H, —C(Ar)H—), 3.04-2.81 (m, 2H, —CH2-), 2.32 (s, 3H, ArCH3), 2.30 (s, 3H, ArCH3), 1.54 (s, 3H, —CH3), 1.09 (s, 3H, —CH3).

compound No. D-4: $^1$H-NMR ($CDCl_3$, 399.78 MHz): δ=6.94 (s, 1H, ArH), 6.81 (s, 1H, ArH), 3.45-3.41 (m, 1H, —C(Ar)H—), 3.02-2.82 (m, 2H, —CH2-), 2.32 (s, 6H, ArCH3), 1.54 (s, 3H, —CH3), 1.06 (s, 3H, —CH3).

compound No. D-5: $^1$H-NMR ($CDCl_3$, 399.78 MHz): δ=7.20-7.12 (m, 4H, ArH), 3.51-3.47 (m, 1H, —C(Ar)H—), 3.03-2.83 (m, 2H, —CH2-), 2.65 (q, 2H, J=7.6 Hz, 15.6 Hz, —ArCH2-), 1.54 (s, 3H, —CH3), 1.23 (t, 3H, J=7.2 Hz, —CH2CH3), 1.05 (s, 3H, —CH3).

compound No. D-19: $^1$H-NMR ($CDCl_3$, 399.78 MHz): δ=7.09 (s, 1H, ArH), 7.05-7.00 (m, 2H, ArH), 6.41 (brs, 1H, —NH—), 5.86 (d, 1H, J=2 Hz, =CH—), 2.50 (s, 3H, ArCH3), 2.24 (s, 3H, ArCH3), 1.41 (s, 6H, —CH3).

[Method for Producing Optically Active Compound]

Optically active compound No. 2 (referred to also as compound No. 2 (−)) shown below was produced. The symbol * in the formula indicates an enantiomeric excess compound.

2(-)

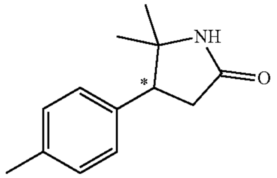

The specific rotation of Compound 2 (−) was (−) Specifically, it was "specific rotation [α] (365 nm, 25° C.)=−98.8 (c1.057, dichloromethane)". The melting point was 154° C. to 155° C. The enantiomer excess was 99.8% ee.

The production method thereof is shown below.

Production Example 7

Synthesis of (−)-5,5-dimethyl-4-(4-methylphenyl)-2-pyrrolidinone (Compound 2 (−))

[Step 1]

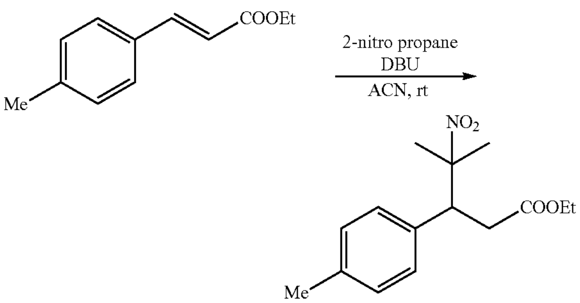

Intermediate 15
86.3%

A mixture of ethyl (E)-3-(p-tolyl)acrylate (118.59 g), acetonitrile (300 ml), 2-nitropropane (140.24 mL), and DBU (232.60 mL) was stirred overnight at room temperature.

1N hydrochloric acid was added thereto, and the mixture was extracted with diethyl ether. The resulting organic layer was dried over anhydrous sodium sulfate and concentrated under reduced pressure. The residue obtained was subjected to silica gel chromatography (hexane:ethyl acetate=95:5) to obtain 150.35 g of intermediate 15 represented by the aforementioned formula with a yield of 86.3%.

$^1$H-NMR data of the resulting intermediate 15 are shown below.

$^1$H-NMR ($CDCl_3$, 399.78 MHz): δ=7.12-7.07 (m, 4H, ArH), 4.02-3.90 (m, 2H, —COOCH2-), 3.88-3.84 (m, 1H, —C(Ar)H—), 2.89-2.60 (m, 2H, —CH2COO—), 2.31 (s, 3H, —ArCH3), 1.57 (s, 3H, —CH3), 1.48 (s, 3H, —CH3), 1.05 (t, 3H, J=6.8 Hz, —CH2CH3).

[Step 2]

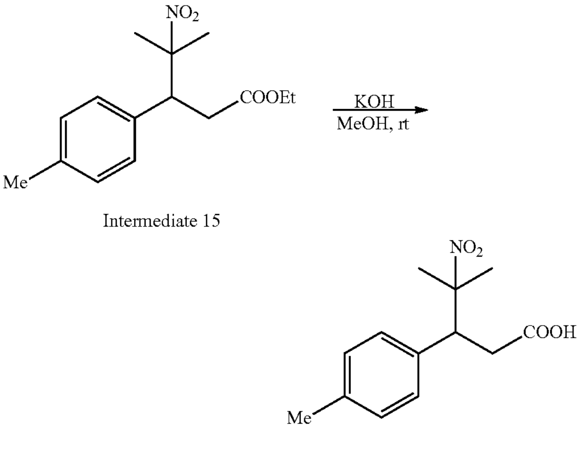

Intermediate 15

Intermediate 16
74.6%

A mixture of intermediate 15 (5.58 g), methanol (20 ml), and potassium hydroxide (1.68 g) was stirred overnight at room temperature.

Water was added to the resulting mixture, and the mixture was extracted with diethyl ether. Concentrated hydrochloric acid was added to the resulting aqueous layer, and the mixture was extracted with dichloroethane. The resulting organic layer was dried over anhydrous sodium sulfate and concentrated under reduced pressure, to obtain 3.75 g of intermediate 16 represented by the aforementioned formula with a yield of 74.6%.

$^1$H-NMR data of the resulting intermediate 16 are shown below.

$^1$H-NMR ($CDCl_3$, 399.78 MHz): δ=7.12-7.05 (m, 4H, ArH), 3.83-3.79 (m, 1H, —C(Ar)H—), 2.91-2.61 (m, 2H, —CH2COO—), 2.31 (s, 3H, —ArCH3), 1.54 (s, 3H, —CH3), 1.45 (s, 3H, —CH3).

[Step 3]

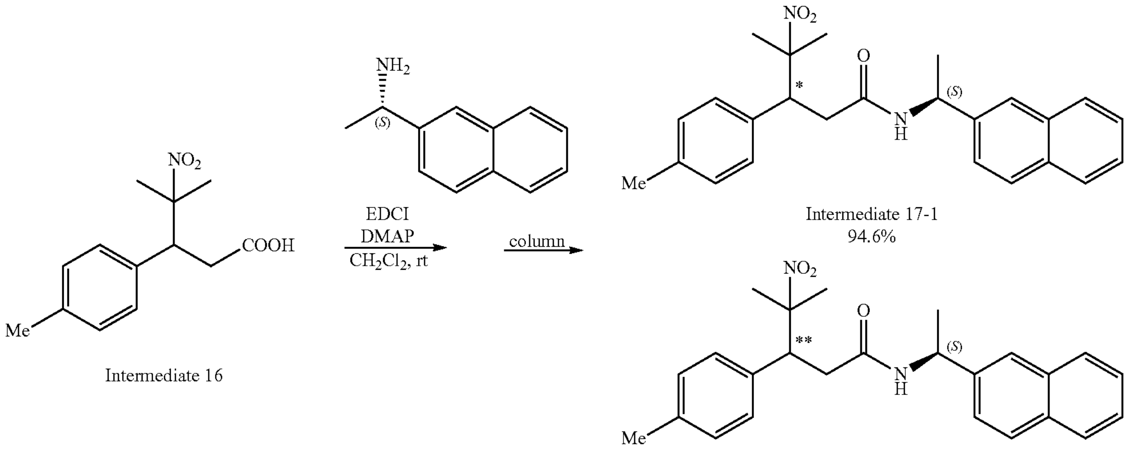

Intermediate 16

Intermediate 17-1
94.6%

Intermediate 17-2
91.1%

A mixture of intermediate 16 (2.51 g), dichloromethane (200 ml), (S)-1-(naphthalen-2-yl)ethan-1-amine (2.10 g), 1-(3-dimethylaminopropyl)-3-ethylcarbodiimide hydrochloride (3.83 g), and 4-dimethylaminopyridine (0.37 g) was stirred overnight at room temperature.

Water was added to the resulting mixture, and the mixture was extracted with dichloroethane. The resulting organic layer was dried over anhydrous sodium sulfate and concentrated under reduced pressure. The residue obtained was subjected to silica gel chromatography (hexane:ethyl acetate=1:1) to obtain 1.91 g of intermediate 17-1 represented by the aforementioned formula with a yield of 94.6% and 1.84 g of intermediate 17-2 represented by the aforementioned formula with a yield of 91.1%.

$^1$H-NMR data of intermediate 17-1 obtained are shown below.

$^1$H-NMR ($CDCl_3$, 399.78 MHz): δ=7.80-7.73 (m, 3H, ArH), 7.53 (s, 1H, ArH), 7.49-7.43 (m, 2H, ArH), 7.19-7.17 (m, 1H, ArH), 7.13-7.06 (m, 4H, ArH), 5.48 (brd, 1H, J=7.6 Hz, —NH—), 5.09-5.02 (m, 1H, —C*(Me)H—), 3.78-3.74 (m, 1H, —C(Ar)H—), 2.71-2.62 (m, 2H, —CH2CO—), 2.32 (s, 3H, —ArCH3), 1.55 (s, 3H, —CH3), 1.52 (s, 3H, —CH3), 1.28-1.23 (m, 3H, C*—CH3).

$^1$H-NMR data of intermediate 17-2 obtained are shown below.

$^1$H-NMR ($CDCl_3$, 399.78 MHz): δ=7.78-7.75 (m, 1H, ArH), 7.69-7.66 (m, 1H, ArH), 7.61 (d, 1H, J=8 Hz, ArH), 7.47-7.41 (m, 2H, ArH), 7.38 (s, 1H, ArH), 7.05-7.01 (m, 4H, ArH), 6.89-6.86 (m, 1H, ArH), 5.48 (brd, 1H, J=8.4 Hz, —NH—), 5.13-5.05 (m, 1H, —C*(Me)H—), 3.79-3.75 (m, 1H, —C(Ar)H—), 2.72-2.61 (m, 2H, —CH2CO—), 2.27 (s, 3H, —ArCH3), 1.55 (s, 3H, —CH3), 1.54 (s, 3H, —CH3), 1.44-1.42 (m, 3H, C*—CH3).

[Step 4]

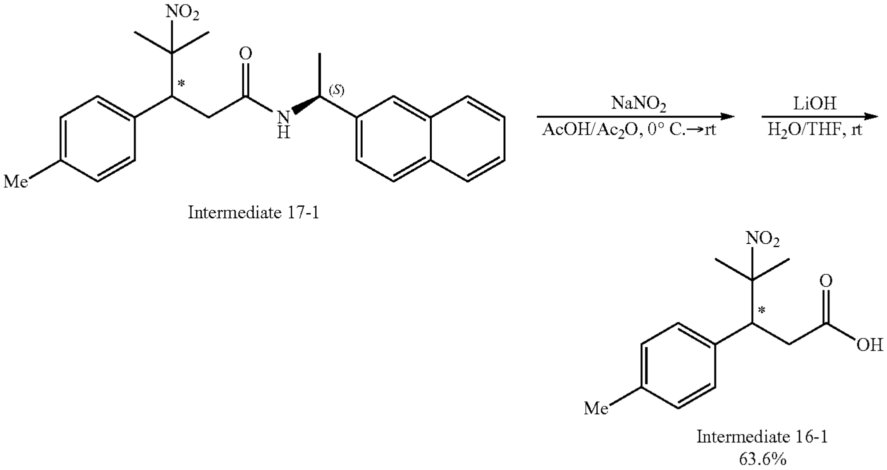

A mixture of intermediate 17-1 (1.90 g), acetic acid (15 ml), acetic anhydride (30 ml), and sodium nitrite (3.24 g) was stirred overnight at room temperature.

Sodium bicarbonate water was added to the resulting mixture, and the mixture was extracted with ethyl acetate. The resulting organic layer was dried over anhydrous sodium sulfate and concentrated under reduced pressure. THF (30 mL), water (15 mL), and lithium hydroxide (0.22 g) were added to the residue obtained, followed by stirring overnight at room temperature.

Water was added to the resulting mixture, and the mixture was extracted with diethyl ether. Concentrated hydrochloric acid was added to the resulting aqueous layer, and the mixture was extracted with dichloroethane. The resulting organic layer was dried over anhydrous sodium sulfate and concentrated under reduced pressure, to obtain 0.75 g of intermediate 16-1 represented by the aforementioned formula with a yield of 63.6%.

[Step 5]

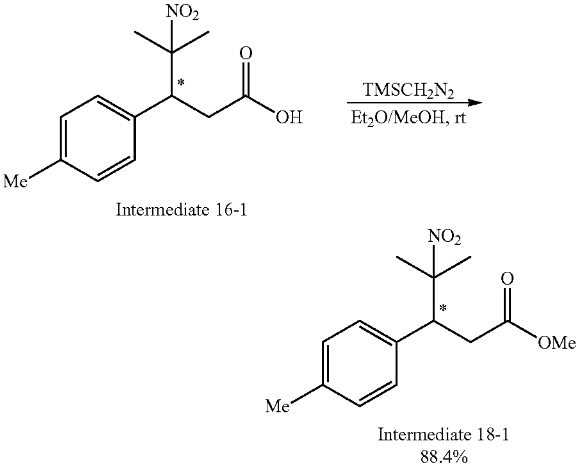

A 10% hexane solution of trimethylsilyldiazomethane (3.0 ml) was added to a mixture of intermediate 16-1 (0.75 g), diethyl ether (12 ml), and methanol (3 ml) under cooling with ice. The temperature was raised to room temperature, followed by stirring for 1 hour.

Acetic acid was added to the resulting mixture, and the mixture was concentrated under reduced pressure. The residue obtained was subjected to silica gel chromatography (hexane:ethyl acetate=9:1) to obtain 0.70 g of intermediate 18-1 represented by the aforementioned formula with a yield of 88.4%.

$^1$H-NMR data of the resulting intermediate 18-1 are shown below.

$^1$H-NMR ($CDCl_3$, 399.78 MHz): δ=7.12-7.07 (m, 4H, ArH), 3.88-3.85 (m, 1H, —C(Ar) H—), 3.51 (s, 3H, —COOCH3), 2.91-2.61 (m, 2H, —CH2COO—), 2.31 (s, 3H, —ArCH3), 1.56 (s, 3H, —CH3), 1.47 (s, 3H, —CH3).

[Step 6]

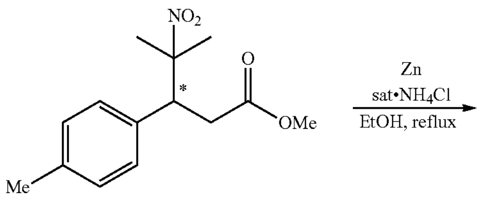

Intermediate 18-1

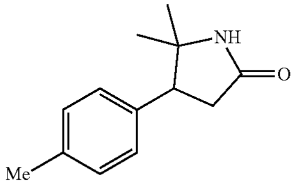

2(-)
(99.8% ee)
76.7%

A mixture of intermediate 18-1 (0.70 g), ethanol (12 mL), a saturated ammonium chloride aqueous solution (3 ml), and zinc (1.46 g) was stirred overnight under reflux.

The resulting mixture was allowed to cool to room temperature and filtered through celite. Water was added to the resulting filtrate, and the mixture was extracted with ethyl acetate. The resulting organic layer was dried over anhydrous sodium sulfate and concentrated under reduced pressure. The residue obtained was subjected to silica gel chromatography (ethyl acetate:methanol=9:1) to obtain 0.43 g of compound 2 (−) (99.8% ee) with a yield of 76.7%.

Likewise, optically active compound No. 1 shown below (referred to as compound No. 1 (−)) was also produced. The symbol * in the formula indicates an enantiomeric excess compound.

1(-)

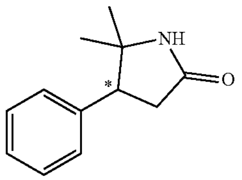

The specific rotation of compound 1 (−) was (−). Specifically, it was "specific rotation [α] (365 nm, 25° C.)=−110.4 (c1. 087, dichloromethane)". The melting point was 119-121° C. The enantiomer excess was 99.7% ee.

Likewise, optically active compound No. 3 (referred to as compound No. 3 (−)) shown below was also produced. The symbol * in the formula indicates an enantiomeric excess compound.

3(-)

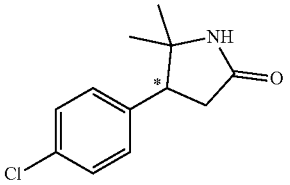

The specific rotation of compound 3 (−) was (−) Specifically, it was "specific rotation [α] (365 nm, 25° C.)=−86.3 (c1. 629, dichloromethane)". The melting point was 174-175° C. The enantiomer excess was 99.2% ee.

Optically active compound No. B-12 (referred to as compound No. B-12 (−)) shown below was also produced. The symbol * in the formula indicates an enantiomeric excess compound.

B-12(-)

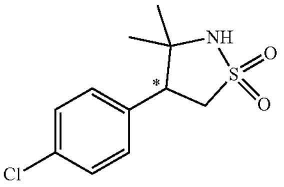

This compound was prepared by preparative purification using a chiral separation column.

The specific rotation of compound B-12 (−) was (−) Specifically, it was "specific rotation [α] (365 nm, 25° C.)=−53.88 (c1.629, dichloromethane)". The enantiomer excess was 99.9% ee.

The conditions for fractionation are shown below. A preparative sample was prepared by adding 2-propanol to compound B-12 to prepare a solution with a concentration of 20 mg/mL, and further adding n-heptane to make a solution with a concentration of 10 mg/mL.

(Preparative Conditions)

Column: CHIRALART Cellulose-C (5 μm) 250×30 mm I.D.
Eluent: n-Heptane/2-propanol (50/50)
Flow rate: 21.3 mL/min
Temperature: Ambient
Detection: UV at 230 nm
Load: 330 mg (10 mg/mL)
System: LC-Forte/R (YMC)

A compound having a specific rotation of (+) was also produced with reference to the aforementioned production method. The respective physical property data are shown below.

Compound No. 1 (+): (+)-5,5-dimethyl-4-phenyl-2-pyrrolidinone "Specific rotation [α] (365 nm, 25° C.)=+110.2 (c1.375, dichloromethane)". The melting point was 120-121° C. The enantiomer excess was 99.7% ee.

Compound No. 2 (+): (+)-5,5-dimethyl-4-(4-methylphenyl)-2-pyrrolidinone "Specific rotation [α] (365 nm, 25° C.)=+94.2 (c1.143, dichloromethane)". The melting point was 154° C.-155° C. The enantiomer excess was 98.8% ee.

Compound No. 3 (+): (+)-5,5-dimethyl-4-(4-chlorophenyl)-2-pyrrolidinone "Specific rotation [α] (365 nm, 25° C.)=+86.3 (c0.792, dichloromethane)". The melting point was 174-175° C. The enantiomer excess was 99.6% ee.

Compound No. B-12 (+): (+)-4-(4-chlorophenyl)-3,3-dimethylisothiazolidine-1,1-dioxide "Specific rotation [α](365 nm, 25° C.)=+56.09 (c0.792, dichloromethane)". The melting point was 179-180° C. The enantiomer excess was 99.9% ee.

FORMULATION EXAMPLES

A few formulation examples of the control agent of the present invention are shown. Compound (I) (active ingredient), additives, and added ratios are not limited to such examples and can be changed in a wide range. Parts in the formulation examples indicates parts by weight.

(Formulation Example 1) Wettable Powder

Compound (I): 20 parts
White carbon: 20 parts
Diatomaceous earth: 52 parts
Sodium alkyl sulfate: 8 parts The aforementioned materials were uniformly mixed and finely pulverized to obtain a wettable powder containing 20% of the active ingredient.

(Formulation Example 2) Emulsifiable Concentrate

Compound (I): 20 parts
Xylene: 55 parts
Dimethylformamide: 15 parts
Polyoxyethylene phenyl ether: 10 parts The aforementioned materials were mixed and dissolved to obtain an emulsifiable concentrate containing 20% of the active ingredient.

(Formulation Example 3) Granule

Compound (I): 5 parts
Talc: 40 parts
Clay: 38 parts
Bentonite: 10 parts
Sodium alkyl sulfate: 7 parts The aforementioned materials were uniformly mixed and finely pulverized, and the mixture was granulated into granules having a diameter of 0.5 to 1.0 mm to obtain a granule containing 5% of the active ingredient.

(Formulation Example 4) Liquid Formulation

Compound (I): 10 parts
Dimethylsulfoxide: 75 parts
Polyoxyethylene alkyl ether: 5 parts
Polyoxyethylene higher fatty acid ether: 10 parts The aforementioned materials were mixed and dissolved to obtain a solution containing 10% of the active ingredient.

Biological Experimental Examples (Experimental Examples 1) Hatching Accelerating Effect Evaluation Test for *Globodera pallida* (Liquid Immersion Test)

(1) Preparation of Test Reagent Solution

A predetermined amount of compound (I) was dissolved in an aqueous solution containing 0.05% (v/v) of polyoxyethylene sorbitan monolaurate (Tween20) to prepare a 100 ppm solution of compound (I).

The 100 ppm solution of compound (I) was further diluted with a 0.05% (v/v) Tween20 aqueous solution to prepare a test reagent solution with a concentration of compound (I) of 2 ppm.

(2) Test Method

The cysts of *Globodera pallida* increased in a greenhouse before the previous year were isolated from the soil, immersed in distilled water and kept at 16° C. for about 2 weeks were crushed with a scalpel and the eggs were taken out to obtain an egg suspension. After preparing a density of approximately 600 eggs per mL, Tween 20 was added to a concentration of 0.05% (v/v). 1 mL of this egg suspension was put into a 13.5 mL screw cap glass vial (inner diameter: 2.1 cm, height: 4.8 cm), and 1 mL each of a test reagent solution with a concentration of compound (I) of 2 ppm was added. It was covered and kept at 16° C.

About 2 weeks later, 1 mL was taken out, and the number of hatching larvae and the number of eggs were counted under a stereomicroscope. Two replicates were installed for each compound, and the average hatching rate was calculated.

(3) Test Results

Table 6 shows the test results.

TABLE 6

| Compound No. | Average hatching rate (%) |
|---|---|
| 1 | 83.0 |
| 2 | 94.3 |
| 3 | 95.2 |
| 4 | 97.9 |
| 5 | 95.6 |
| 6 | 38.0 |
| 7 | 86.6 |
| 8 | 94.1 |
| 9 | 72.3 |
| 10 | 69.2 |
| 11 | 72.9 |
| 12 | 65.4 |
| 13 | 62.6 |
| 14 | 37.6 |
| 15 | 77.3 |
| 16 | 69.2 |
| 17 | 58.6 |
| 18 | 97.1 |
| 19 | 84.6 |
| 20 | 63.1 |
| 21 | 76.6 |
| A-1 | 77.4 |
| A-2 | 97.4 |
| A-3 | 97.2 |
| A-4 | 68.8 |
| A-5 | 92.6 |
| A-6 | 93.6 |
| A-7 | 93.9 |
| B-1 | 70.4 |
| B-2 | 86.6 |
| B-3 | 21.2 |
| B-4 | 96.3 |
| B-5 | 96.9 |
| B-6 | 97.1 |
| B-7 | 96.6 |
| B-8 | 51.2 |
| B-9 | 69.5 |
| B-10 | 82.7 |
| B-11 | 80.2 |
| B-12 | 93.0 |
| C-1 | 94.0 |
| D-1 | 65.6 |
| D-2 | 94.7 |
| D-3 | 58.8 |
| D-4 | 40.1 |
| D-5 | 56.6 |
| D-6 | 67.5 |

TABLE 6-continued

| Compound No. | Average hatching rate (%) |
|---|---|
| D-7 | 95.2 |
| D-8 | 91.8 |
| D-9 | 50.1 |
| D-10 | 36.4 |
| D-11 | 59.0 |
| D-12 | 52.0 |
| D-13 | 60.1 |
| D-14 | 63.7 |
| D-15 | 94.9 |
| D-16 | 66.5 |
| D-17 | 55.4 |
| D-18 | 58.8 |
| D-19 | 95.7 |

(4) Test Results for Optically Active Compounds

Table 7 shows the test results for optically active compounds among compound (I). Some compounds were also tested at even lower concentrations.

TABLE 7

| Compound No. | Average hatching rate at 1 ppm (%) | Average hatching rate at 100 ppb (%) | Average hatching rate at 10 ppb (%) |
|---|---|---|---|
| 1 (−) | 87.7 | 47.2 | |
| 1 (+) | 37.8 | 12.8 | |
| 2 (−) | 91.8 | 93.1 | 79.9 |
| 2 (+) | 63.6 | 31.6 | 7.7 |
| 3 (−) | 92.0 | 95.1 | 93.2 |
| 3 (+) | 93.2 | 63.3 | 5.9 |
| B-12(−) | 94.6 | 95.4 | 93.5 |
| B-12(+) | 95.2 | 80.9 | 14.5 |

(Experimental Examples 2) Reduction Test of *Globodera Pallida* Egg Density (Pot Test)

(1) Preparation of Test Reagent Solution

After 20 mg of compound (I) was dissolved in 1 mL of dimethylsulfoxide, 199 mL of a 0.1% polyoxyethylene sorbitan monolaurate aqueous solution was added thereto, to obtain a test reagent solution with a concentration of compound (I) of 100 ppm. Further, this was diluted 10-fold with distilled water, to prepare a 10 ppm test reagent solution.

(2) Test Method

Soil was collected from a field infected with *Globodera pallida*, and the egg density was investigated, as follows. The cysts were separated from 100 g of the dried soil by dry flotation-sieving method and crushed to release nematode eggs, and the number of eggs was counted under a stereomicroscope. This was taken as the initial density.

32 mL of the test reagent solution adjusted to 100 ppm or 10 ppm was added to 800 mL of the collected field soil, followed by stirring well. It was packed in a plastic pot (upper diameter: 10.5 cm, height: 22.5 cm), and placed in a greenhouse without any planting for 30 days. Each pot was watered with 26 mL of distilled water every 6 to 7 days.

After 30 days, the soil was spread on an aluminum bat and air-dried, and the cysts were separated from 100 g of the dry soil in the same manner as above, to count the number of remaining eggs (density after treatment). Three pots were installed per concentration for each compound, and the average density reduction rate was calculated from the initial density and the density after treatment.

(3) Test Results

This test was performed for Compound Nos. 2, 3, 4, 5, 12, 18, A-3, and D-15. A pot that was no treated with any compound was taken as a control.

Table 8 shows the test results.

TABLE 8

| Compound No. | Average density reduction rate at 100 ppm (%) | Average density reduction rate at 10 ppm (%) |
|---|---|---|
| 2 | 98.0 | 95.4 |
| 3 | 98.5 | 97.4 |
| 4 | 98.9 | 98.8 |
| 5 | 98.2 | 94.1 |
| 12 | 98.8 | 97.7 |
| 18 | 96.2 | 81.7 |
| A-3 | 97.2 | 94.9 |
| D-15 | 98.2 | 85.8 |
| control | 6.9 | 12.7 |

(Experimental Examples 3) Reduction Test of *Globodera Pallida* Egg Density (Field Plot Test)

(1) Preparation of Test Reagent Solution

With reference to Formulation Example 4, a 10% solution of compound No. 2 was prepared. This 10% solution was diluted with distilled water, to prepare test reagent solutions with concentrations of 300 ppm, 30 ppm, and 3 ppm.

(2) Test Method

Round plots (diameter: 30 cm) were installed in a field infected with *Globodera pallida*, and the reducing effect of reagent solution treatment on the nematode egg density in soil was investigated. Each plot was prepared by burying a cylinder (30 cm in diameter and 25 cm in height) made of polyethylene sheet to a depth of 20 cm. Test plots were installed in the field and soil samples in each plot were collected for the initial density survey. Then, the test reagent solution of each concentration was sprayed at a ratio of 5 or 1 L per square meter and the soil in the plot was mixed with a shovel to a depth of 15 cm. As a result, treatments with four different doses of compound (1500, 300, 30 and 3 g per 10 a) were prepared.

About 80 days later, the soil in each plots was collected, and the nematode egg density in the soil was investigated, as follows. The cysts were separated from 100 g of dried soil by a sieving cyst flow method, crushed with a scalpel to extract eggs, suspended in distilled water to extract a certain amount, and the number of eggs was counted under a stereomicroscope.

Four plots were installed for each concentration, and the average density reduction rate was calculated from the initial density and final density.

(3) Test Results

The treatment with the compound (compound No. 2) greatly reduced the Gp density in the soil. The Gp density reduction rate for each dose of the compound was as follows. Treatment of compound at a dose of 30 g or more per 10a could reduce by 80% or more of Gp density in the soil. It is demonstrating the compound has remarkable reducing effect on Gp density.

Dose: 1500 g/10 a: 98.4%

300 g/10 a: 94.4% g/10 a: 88.8%

3 g/10 a: 65.6%

0 g/10 a (control): 9.0%

(All are Averages of the Four Plots)

Since compounds randomly selected from compound (I) showed remarkable reducing effect to Gp density, it can be assumed that compounds belong to compound (I) including compounds that could not be mentioned have high Gp control effect widely.

The invention claimed is:

1. A compound of formula (I-b), a stereoisomer thereof, or a salt thereof:

(I-b)

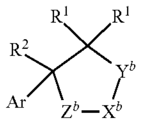

wherein

Ar represents a substituted or unsubstituted phenyl group, or a substituted or unsubstituted naphthyl group;

$R^1$ each independently represents a substituted or unsubstituted C1 to 6 alkyl group, a substituted or unsubstituted C2 to 6 alkenyl group, a substituted or unsubstituted C2 to 6 alkynyl group, a substituted or unsubstituted C3 to 6 cycloalkyl group, a substituted or unsubstituted phenyl group, or a substituted or unsubstituted naphthyl group;

$R^2$ represents a hydrogen atom or a substituted or unsubstituted C1 to 6 alkyl group;

a partial structure —$Y^b$—$X^b$— represents a group represented by *—NH—$SO_2$—**;

where * indicates a binding position to the carbon atom having two $R^1$, and indicates a binding position to $Z^b$; and $Z^b$ represents a substituted or unsubstituted methylene group.

2. The compound according to claim 1, wherein Ar represents a substituted or unsubstituted phenyl group.

3. The compound according to claim 1, wherein Ar represents a substituted or unsubstituted naphthyl group.

* * * * *